(12) United States Patent
Kunieda et al.

(10) Patent No.: US 7,712,116 B2
(45) Date of Patent: May 4, 2010

(54) PROGRAM-DISPLAY CONTROL APPARATUS AND PROGRAM-DISPLAY CONTROL METHOD

(75) Inventors: Shunsuke Kunieda, Tokyo (JP); Shingo Utsuki, Kanagawa (JP); Keiichi Yoshioka, Tokyo (JP); Kae Nagano, Tokyo (JP)

(73) Assignee: Sony Corporation (JP)

( * ) Notice: Subject to any disclaimer, the term of this patent is extended or adjusted under 35 U.S.C. 154(b) by 1430 days.

(21) Appl. No.: 10/515,664

(22) PCT Filed: May 22, 2003

(86) PCT No.: PCT/JP03/06404

§ 371 (c)(1),
(2), (4) Date: Nov. 23, 2004

(87) PCT Pub. No.: WO03/101094

PCT Pub. Date: Dec. 4, 2003

(65) Prior Publication Data

US 2006/0023116 A1   Feb. 2, 2006

(30) Foreign Application Priority Data

May 23, 2002    (JP) .............................. 2002-148650

(51) Int. Cl.
*H04N 5/445* (2006.01)
*H04N 7/173* (2006.01)
(52) U.S. Cl. .......................................... 725/40; 725/44
(58) Field of Classification Search .................. 725/32, 725/103, 120
See application file for complete search history.

(56) References Cited

U.S. PATENT DOCUMENTS

| | | | | |
|---|---|---|---|---|
| 6,075,570 A | * | 6/2000 | Usui et al. | 725/49 |
| 6,128,009 A | * | 10/2000 | Ohkura et al. | 725/46 |
| 6,147,714 A | * | 11/2000 | Terasawa et al. | 348/564 |
| 6,219,839 B1 | * | 4/2001 | Sampsell | 725/40 |
| 6,246,442 B1 | * | 6/2001 | Harada et al. | 348/569 |
| 6,314,571 B1 | * | 11/2001 | Ogawa et al. | 725/48 |
| 6,462,784 B1 | * | 10/2002 | Kohno et al. | 348/563 |
| 6,532,590 B1 | * | 3/2003 | Chimoto | 725/43 |
| 6,857,128 B1 | * | 2/2005 | Borden et al. | 725/39 |
| 7,134,133 B1 | * | 11/2006 | Wugofski | 725/39 |

(Continued)

FOREIGN PATENT DOCUMENTS

JP    8-275077 A    10/1996

(Continued)

*Primary Examiner*—James Sheleheda
*Assistant Examiner*—Jonathan Lewis
(74) *Attorney, Agent, or Firm*—Lerner, David, Littenberg, Krumholz & Mentlik, LLP

(57) ABSTRACT

A program-display control apparatus can display information on each of a plurality of programs in a state that can be recognized by the user with ease without regard to the display configuration of the display data of the program. A display-configuration modification unit changes the display configurations of the program table of a BS digital broadcast, the program table of a ground wave broadcast, and a WEB program table into a new display configuration which increases the amount of information on the programs without regard to the display configuration of each of the programs. Furthermore, a program-table creation unit creates display data according to the new display configuration and outputs the display data.

22 Claims, 33 Drawing Sheets

U.S. PATENT DOCUMENTS

| | | | |
|---|---|---|---|
| 7,152,236 B1 * | 12/2006 | Wugofski et al. | 725/40 |
| 7,165,264 B1 * | 1/2007 | Westrick | 725/40 |
| 2002/0035727 A1 * | 3/2002 | Numata et al. | 725/44 |
| 2002/0124256 A1 * | 9/2002 | Suzuka | 725/55 |
| 2002/0170057 A1 * | 11/2002 | Barrett et al. | 725/41 |
| 2003/0051244 A1 * | 3/2003 | Klopfenstein | 725/46 |
| 2003/0093795 A1 * | 5/2003 | Takahashi et al. | 725/49 |
| 2007/0130583 A1 * | 6/2007 | Thiagarajan et al. | 725/37 |

FOREIGN PATENT DOCUMENTS

| | | |
|---|---|---|
| JP | 9-270969 A | 10/1997 |
| JP | 11-168666 A | 6/1999 |
| JP | 11-284927 A | 10/1999 |
| JP | 2001-8119 A | 1/2001 |
| JP | 2002-125169 A | 4/2002 |
| JP | 2002-300564 A | 10/2002 |

* cited by examiner

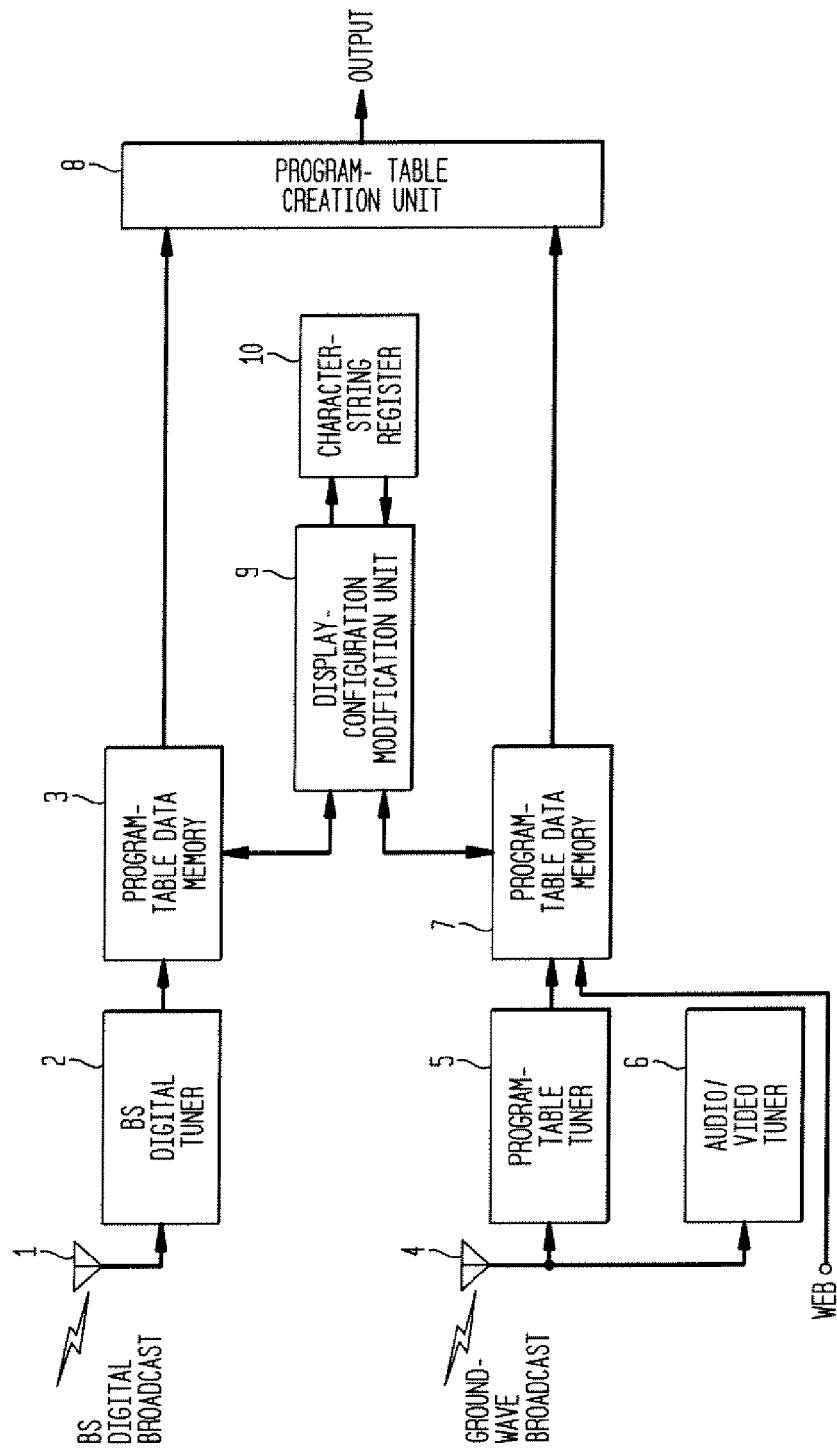

FIG. 11A

|       | CH 141    | CH 142    | CH 143    | CH 151    | ...   |
|-------|-----------|-----------|-----------|-----------|-------|
| 9:00 ... | PROGRAM A | PROGRAM B | PROGRAM C | PROGRAM E | ... |
| 10:00 ... | PROGRAM D |         |           | FOGRAM E  | ... |
| 11:00 |           |           |           |           |       |

FIG. 11B

|       | CH 141    | CH 142    | CH 143    | CH 151    | ...   |
|-------|-----------|-----------|-----------|-----------|-------|
| 9:00 ... | PROGRAM A | PROGRAM B | PROGRAM C | PROGRAM E | ... |
| 10:00 ... | PROGRAM D | PROGRAM D | PROGRAM D | PROGRAM F | ... |
| 11:00 |           |           |           |           |       |

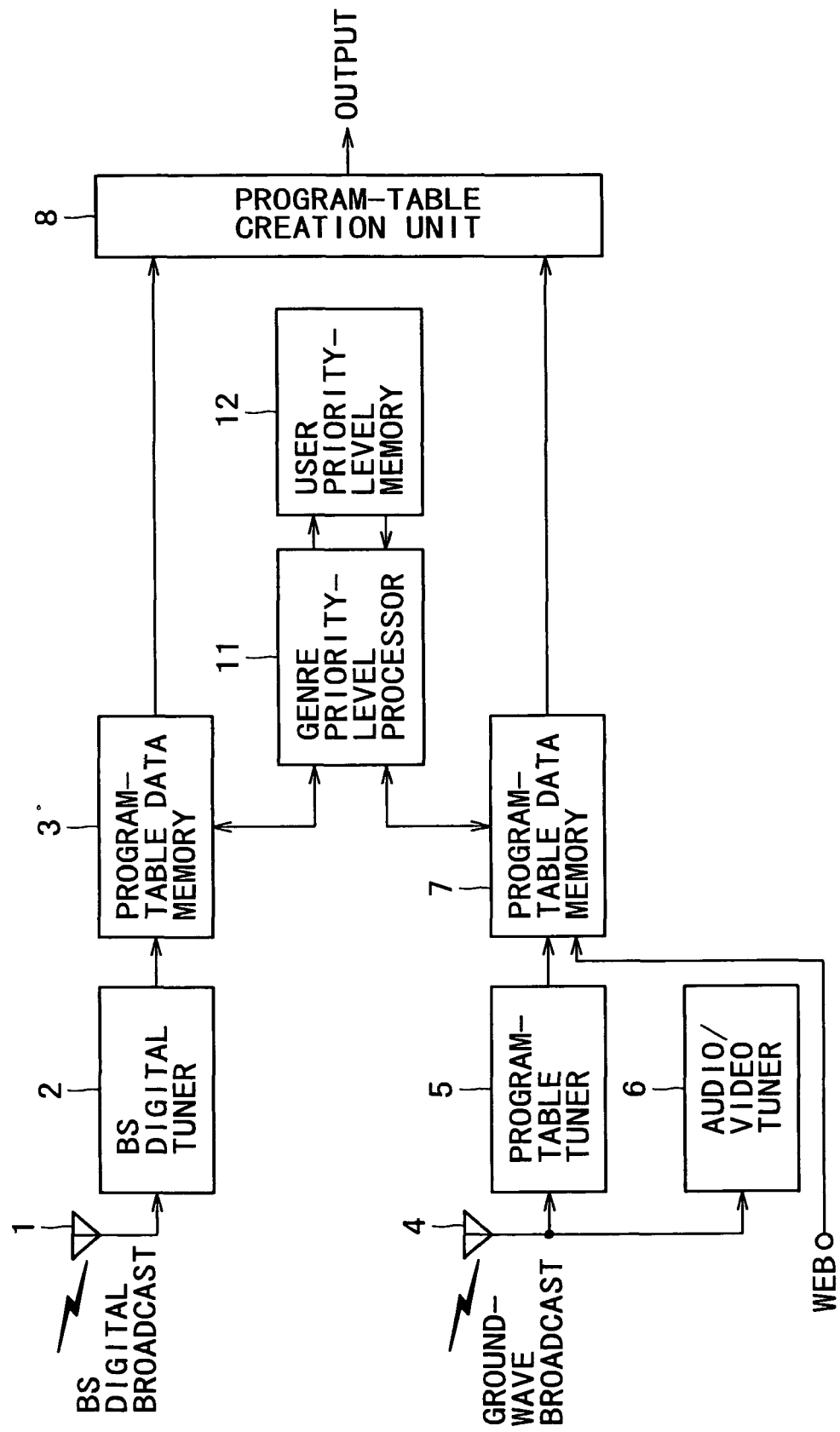

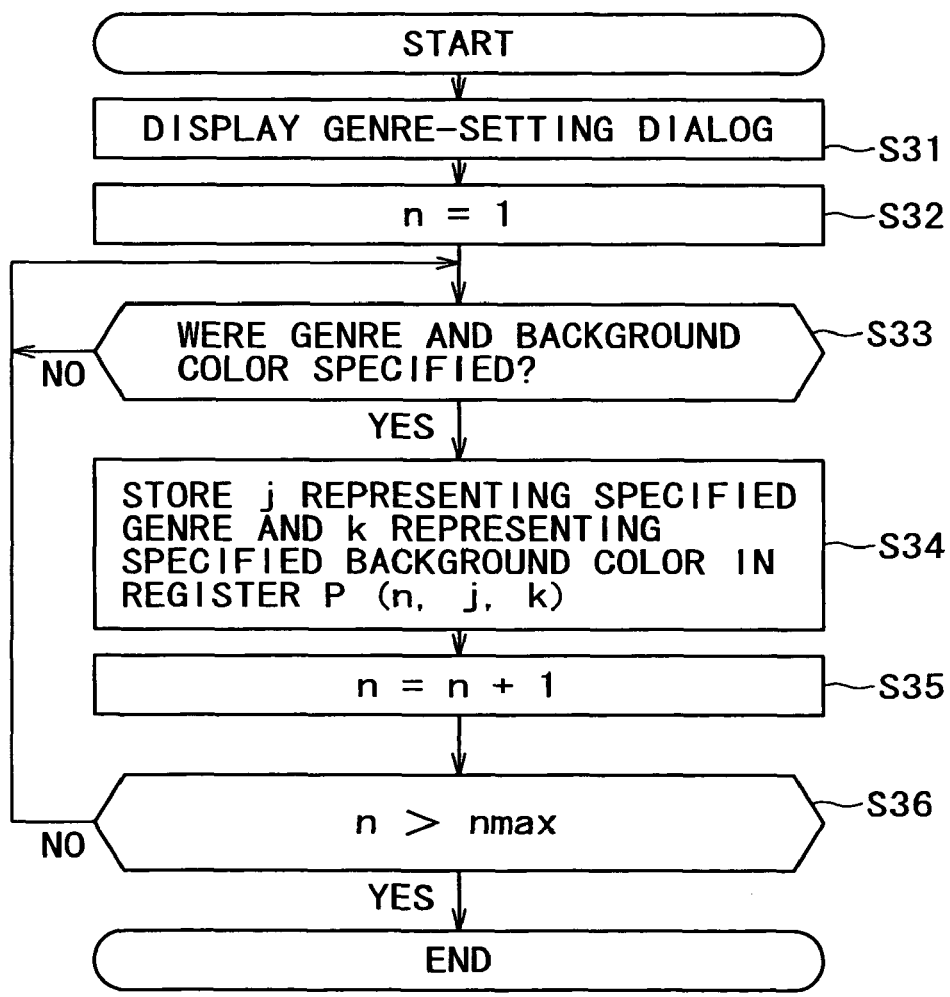

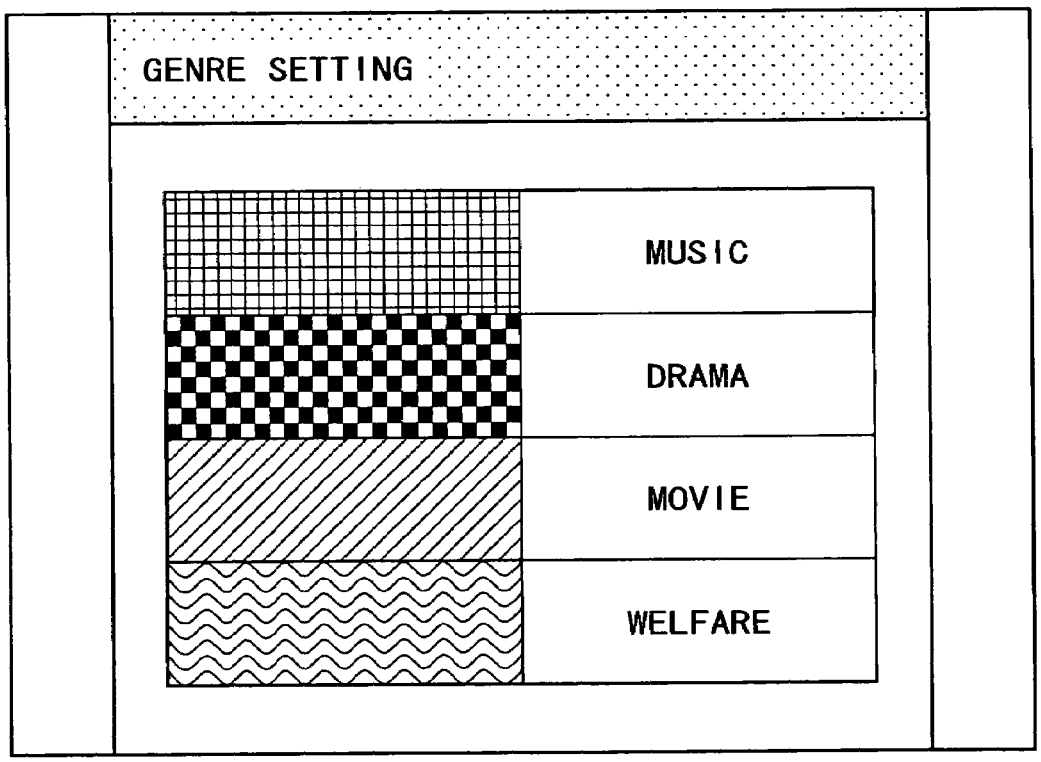
F I G. 1 4

F I G. 1 5 A
F I G. 1 5 B
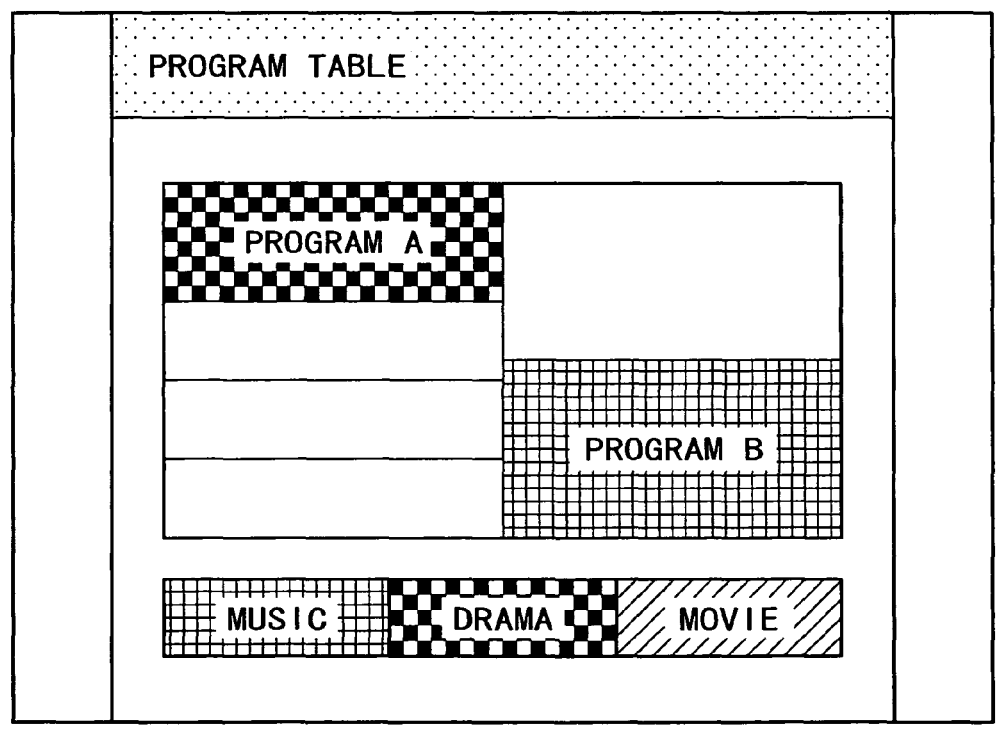

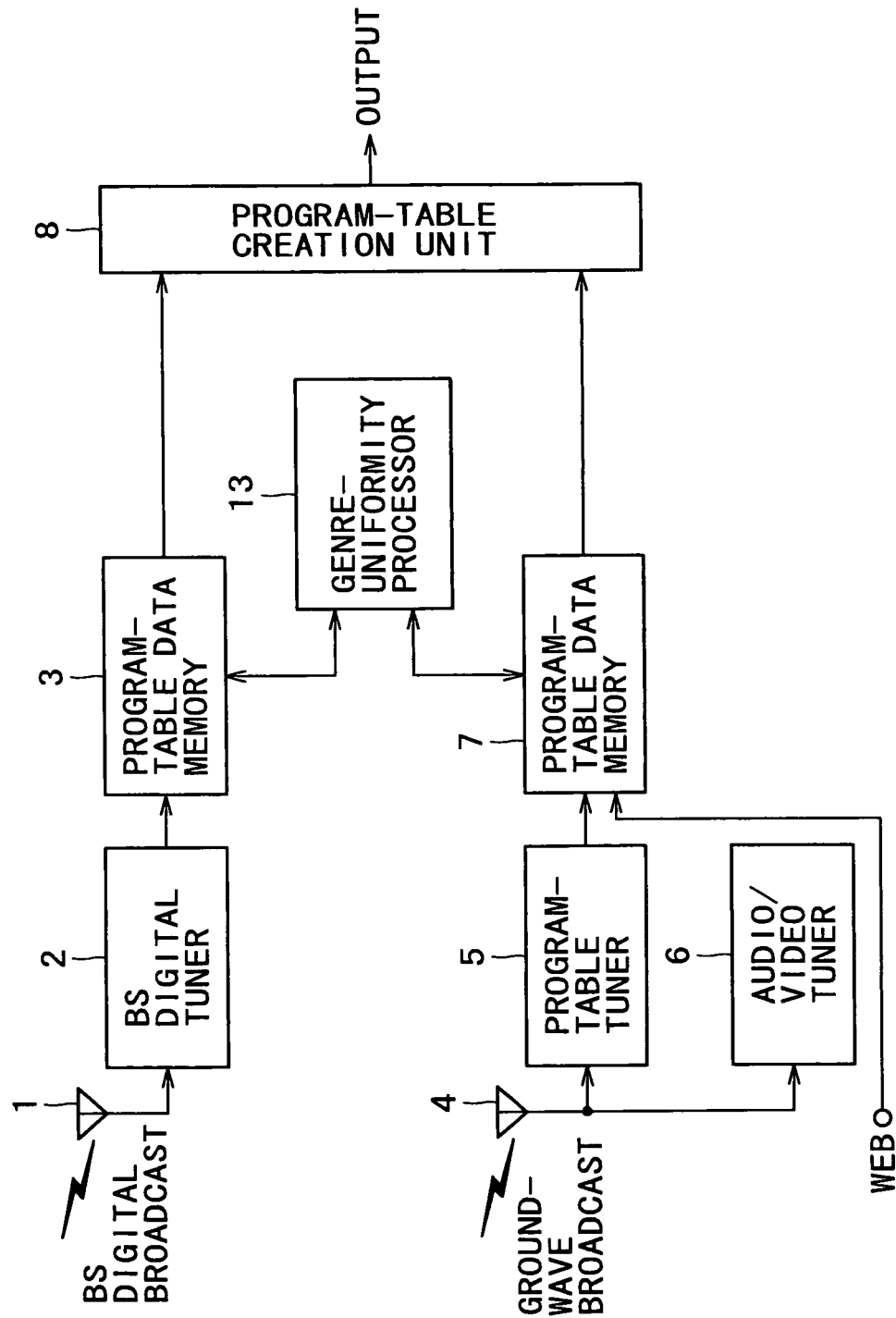

FIG. 17

| GENRES CONFORMING TO ARIB REGULATIONS OF BS DIGITAL BROADCASTS | GENRES OF THE GEMSTAR EPG OF GROUND-WAVE BROADCASTS | WEB GENRES |
|---|---|---|
| NEWS/REPORTS | | NEWS/REPORTS |
| INFORMATION/WIDE SHOWS | | |
| MUSIC | MUSIC | MUSIC |
| MOVIE | BS MOVIE/GROUND-WAVE MOVIE | WEB MOVIE |
| DOCUMENTARY/EDUCATION | | |
| HOBBIES/EDUCATION | | HOBBIES/EDUCATION |
| SPORT | | SPORT |
| DRAMA | DRAMA | DRAMA |
| VARIETY | VARIETY | |
| ANIMATION/SPECIAL EFFECTS | | |
| THEATER/PERFORMANCE | | |
| WELFARE | | |

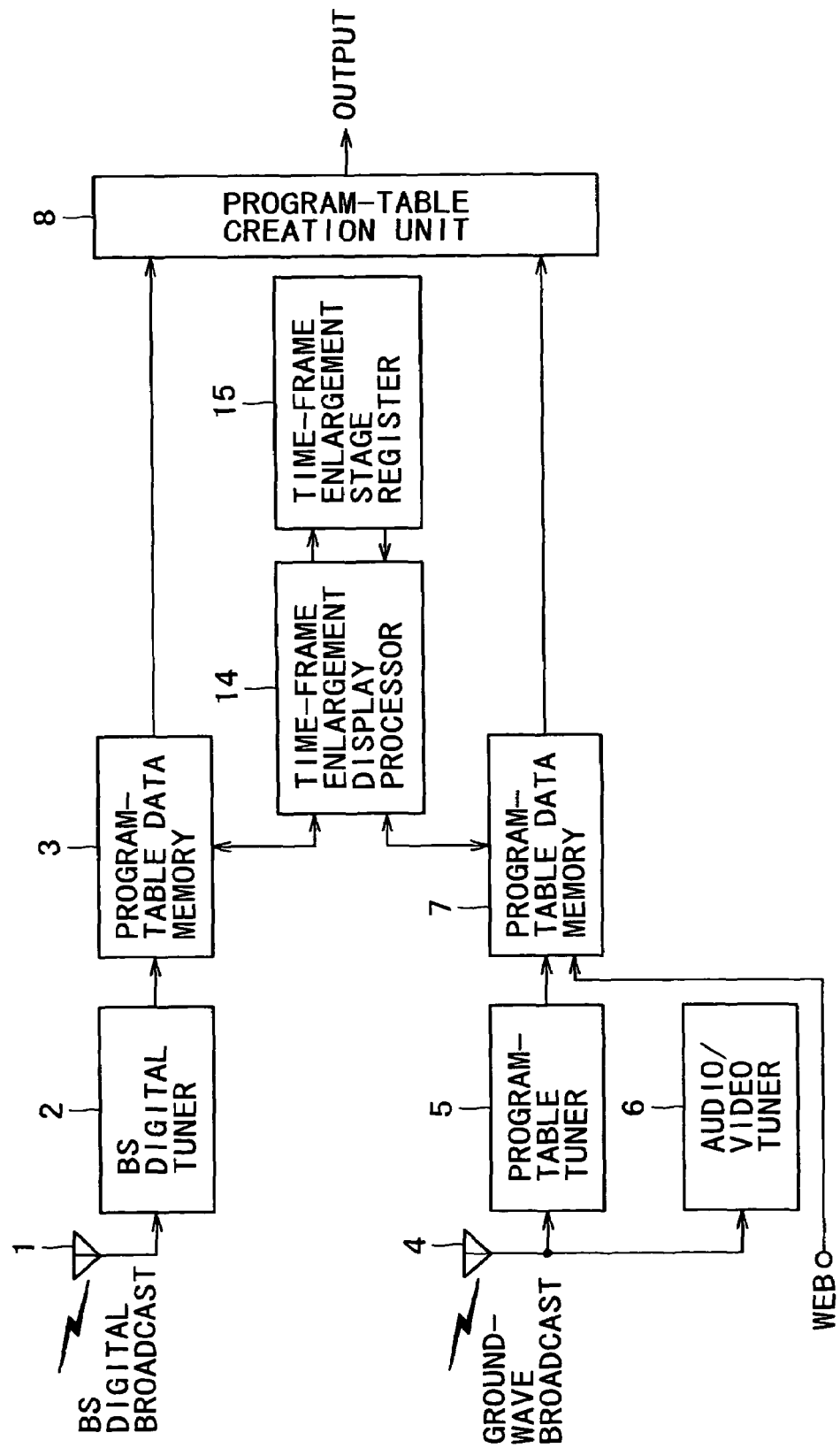

| S | N | T |
|---|---|---|
| 1 | N1 (= 4) | T1 (= 3) |
| 2 | N2 (= 2) | T2 (= 2) |
| 3 | N3 (= 1) | T3 (= 1) |

(STORED IN A MEMORY)

FIG. 26A

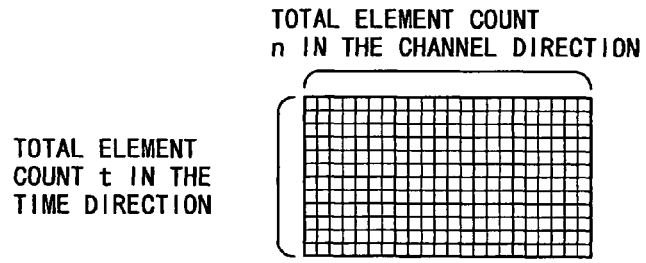

TOTAL ELEMENT COUNT t IN THE TIME DIRECTION

TOTAL ELEMENT COUNT n IN THE CHANNEL DIRECTION

FIG. 26B

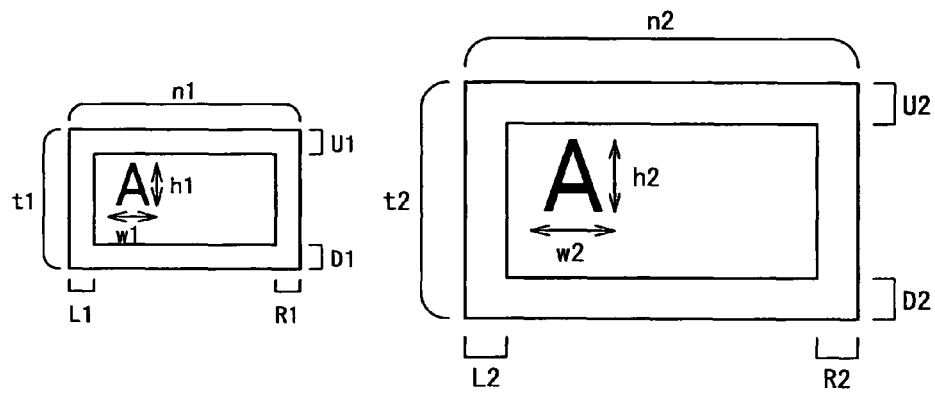

FIG. 26C

| | BEFORE ENLARGEMENT | AFTER ENLARGEMENT |
|---|---|---|
| NUMBER OF ELEMENT IN THE PROGRAM AREA (n IN THE CHANNEL DIRECTION × t IN THE TIME DIRECTION) | t1 × n1 | t2 × n2 |
| CHARACTER SIZE (SIZE IN THE CHANNEL DIRECTION × SIZE IN THE TIME DIRECTION) | h1 × w1 | h2 × w2 |
| UPPER EXTRA WHITE AREA | U1 | U2 |
| LOWER EXTRA WHITE AREA | D1 | D2 |
| RIGHT EXTRA WHITE AREA | R1 | R2 |
| LEFT EXTRA WHITE AREA | L1 | L2 |

FIG. 28

| PROGRAM AREA ENLARGEMENT | $(n2/n1) \times (t2/t1)$ TIMES |
|---|---|
| INCREASE OF INFORMATION WITH CHARACTER SIZE FIXED | $\{(n2 - (R2 + L2)/w2)/(n1 - (R1 + L1)/w1)\} \times \{(t2 - (U2 + D2)/h2)/(t1 - (U1 + D1)/h1)\}$ TIMES |

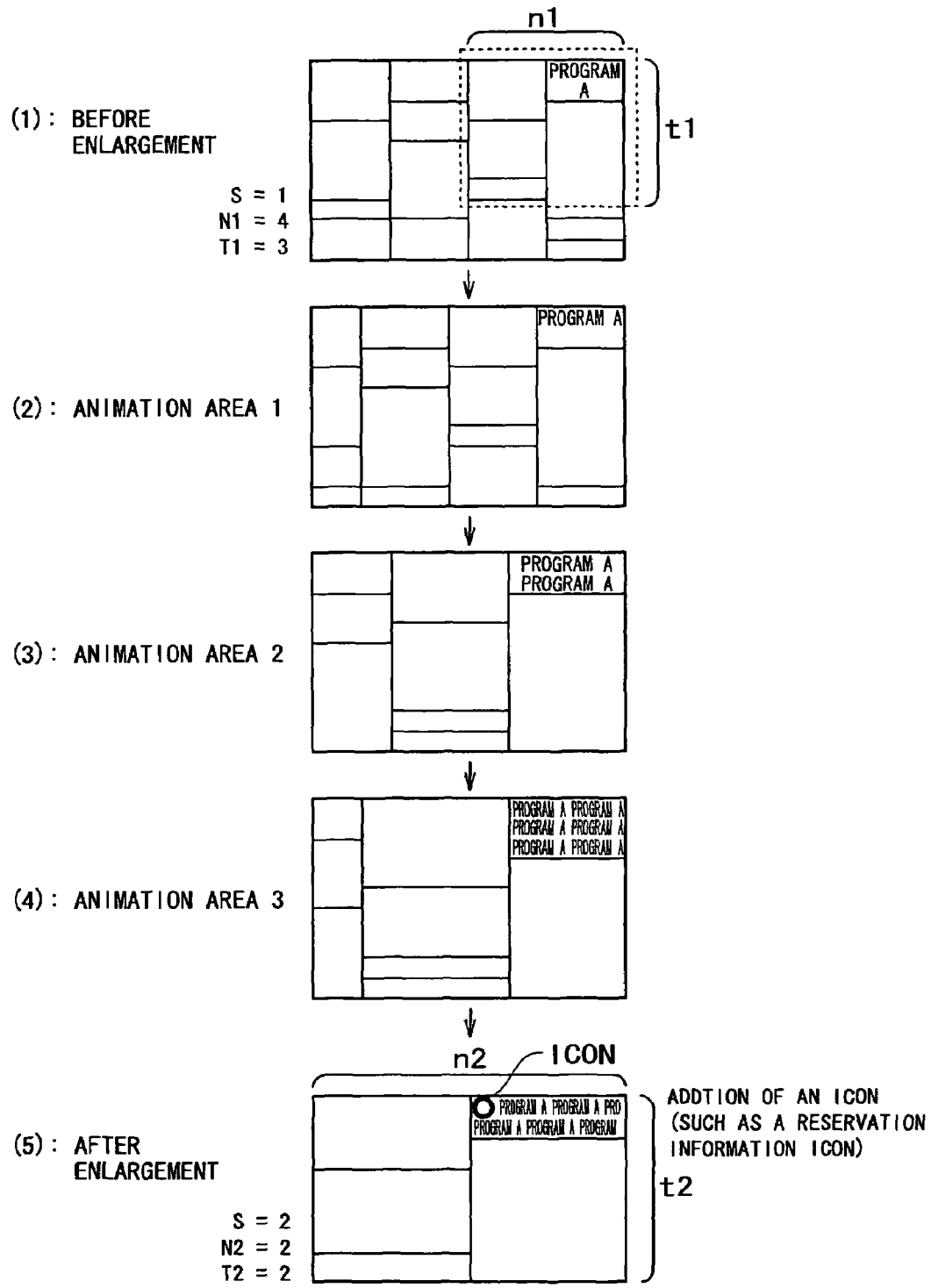

PROGRAM-DISPLAY CONTROL APPARATUS AND PROGRAM-DISPLAY CONTROL METHOD

CROSS-REFERENCE TO RELATED APPLICATIONS

The present application is a national stage application under 35 U.S.C. § 371 of International Application No. PCT/JP03/06404, filed May 22, 2003, which claims priority from Japanese Application No. P2002-148650, filed May 23, 2002, the disclosures of which are incorporated herein by reference.

BACKGROUND OF THE INVENTION

The present invention relates to a program-display control apparatus and a program-display control method which are used for displaying a table of television-broadcast programs and/or a table of web programs. More particularly, the present invention relates to a program-display control apparatus and a program-display control method which are used for displaying a table of television-broadcast programs transmitted by way of a satellite, a table of television-broadcast programs transmitted by ground waves and/or a table of web programs.

Traditionally, a program table is announced to the audience through radio and television columns in a newspaper or a magazine. A program table is a table of scheduled programs of BS (Broadcast Satellite) digital broadcasts or ground wave broadcasts. A BS digital broadcast is a television broadcast transmitted by adopting a digital method by way of a BS. On the other hand, a ground wave broadcast is a television broadcast transmitted by adopting an analog method using a ground wave. In addition, in recent years, a program table transmitted from a television broadcasting station as a program table having a radio/television column format can be displayed on the screen of an apparatus such as a television receiver or a personal computer. As an example of such a program table, an EPG (Electronic Program Guide) produced by Gemstar Corporation is widely known. There are two methods of displaying a program table having a radio/television column format. The two methods are referred to as a program-table display method of a program-frame type and a program-table display method of a time-frame type, respectively. In accordance with either of the methods, the horizontal axis of the screen represents channels or corporation names and the vertical axis represents the time.

However, the conventional program-display control apparatus and the conventional program-display control method have a problem that information on each program cannot be displayed in a format which can be recognized by the user with ease because the data of the program table is configured to be displayed in an EPG format.

For example, with the conventional technology, a program table of a BS digital broadcast cannot be displayed on the same screen as a program table of a ground wave broadcast. Thus, the user must switch the screen from the program table of a BS digital broadcast to the program table of a ground wave broadcast in order to inspect the latter or vice versa. As a result, in order to make a video-recording reservation, the user may need to carry out a very cumbersome operation of switching the screen from the program table of a BS digital broadcast to the program table of a ground wave broadcast. In addition, in recent years, a program table of web programs is also being distributed to the audience. It is also necessary to display the program table of web programs at the same time as the program tables of broadcasts.

On top of that, with the conventional technology, it may be impossible to display information on programs on a displayed table of the programs. The information on a program includes the name and description of the program. FIGS. 33A and 33B are each a diagram showing a typical screen displaying a conventional program table having the radio/television format. To be more specific, FIG. 33A is a diagram showing a typical screen displaying a program table of a program-frame type for a time period of one hour from 10:00 to 11:00. On the other hand, FIG. 33B is a diagram showing a typical screen displaying a program table of a time-frame type for a time period of one hour.

In the case of the program-frame type, the program table has a configuration in which the name of the last program in the time period of one hour and information on the program are always displayed and, in addition, the name of the program having the longest broadcast period in the time period of one hour and information on the longest program are displayed. In the case of the example shown in FIG. 33A, the name of the last program is program B. In the case of the time-frame type, on the other hand, the program table has a configuration in which the name of each program in the time period of one hour and information relevant to the program are displayed in an area with a size proportional to the length of the broadcast time of the program. Thus, in the case of the program table shown in FIG. 33A, since the name of the last program B with a broadcast period from 10:20 to 11:00 and information on the program must be displayed, only a small area is left. As a result, while it is possible to display the name of the first program A with a broadcast period from 10:00 to 10:20 in this small area, it is impossible to display information on the program in the same area. In the figure, the information on program A is represented by a string of characters enclosed in a box formed by dashed lines. In the case of the program table shown in FIG. 33B, by the same token, since the name of program D and information on the program are displayed in an area with a size proportional to the length of the broadcast time of the program, only a small area is left. As a result, while it is possible to display the name of program C with a broadcasting period from 10:00 to 10:10 in this small area with a size proportional to the broadcast time of 10 minutes, it is impossible to display information on the program in the same area. In the figure, the information on program C is represented by a string of characters enclosed in a box formed by dashed lines.

In the case of BS digital broadcasting, programs sharing an event may be broadcast by using a plurality of channels each allocated to one of the programs. In such a case, a large amount of picture data is transmitted through a broad band accommodating the used channels. Thus, it is possible to display a picture having a higher quality than a picture transmitted using only a single channel. With the conventional technology, however, a program table cannot be displayed by placing emphasis on the shared-event programs, each serving as a characteristic program. Thus, the conventional technology does not give a configuration that can be recognized by the user with ease.

In addition, for example, the transmission format of BS digital broadcasts allows information on up to three genres to be added for each program. Since the Association of Radio Industries and Businesses, named ARIB, does not prescribe an order in which the three genres are to be broadcast, however, in accordance with the conventional technology, a first genre in the transmission order is displayed in the program table as a program attribute. Thus, the conventional technology has a problem that, even if a genre which the user wants to see is included in a program, the genre may not be displayed in the program table so that, in this case, the user overlooks the program or misses a video-recording reservation for the program. That is to say, the conventional technology does not give a configuration that allows the user to recognize the genre display of a program with ease.

On the top of that, the transmission format of ground wave broadcasts allows information on only one genre to be added for each program. Thus, the data structure of the EPG information in ground wave broadcasts is different from the data structure of the EPG information in BS digital broadcasts. Thus, even if the genre of a program of a ground wave broadcast is the same as the genre of a program of a BS digital broadcast, the genres cannot be displayed in the same format.

It is thus an object of the present invention addressing the problems described above to provide a program-display control apparatus and a program-display control method which are capable of displaying information on each program in a state easily recognizable to the user without regard to the configuration used to display program-table data included in a received television broadcast signal.

SUMMARY OF THE INVENTION

In order to achieve the object described above, the program-display control apparatus provided by the present invention includes a storage unit operable to store program-table data having a predetermined display configuration; a display-configuration modification unit operable to change the display configuration of the program-table data read out from the storage unit to a new display configuration in accordance with a display-configuration modification command; a program-table creation unit operable to create data of a program table on the basis of the new display configuration and to output the data to a predetermined display; and a display line comparison unit operable to compare a number of programs in a time frame with a maximum number of display lines that can be included in the time frame. If the number of programs in the time frame is smaller than the maximum number of display lines, the display-configuration modification unit finds a display-line count of each individual program in the time frame as a quantity proportional to a time duration of the individual program and allocates as many display lines to each individual program in the time frame as indicated by the display-line count found for the individual program in a descending-duration order starting with a program having a longest time duration. If the number of programs in the time frame is equal to the maximum number of display lines, the display-configuration modification unit allocates display lines composing a minimum display-area unit to each of the programs. If the number of programs in the time frame is greater than the maximum number of display lines, the display-configuration modification unit displays an identifier for indicating that undisplayed programs exist and allocates remaining lines composing the minimum display-area unit to each of the programs in a descending-duration order starting with a program having a longest time duration.

In addition, if a shared-event program exists in a plurality of reception channels, the display-configuration modification unit may change the display configuration of the shared-event program to a display configuration in which the shared-event program is displayed in an area spread over the plurality of reception channels.

In addition, if a time frame of the shared-event program in any one of the plurality of reception channels does not overlap a time frame of the shared-event program in any other one of the plurality of reception channels, the display-configuration modification unit may change the display configuration of the shared-event program to a display configuration in which the shared-event program is displayed on display lines composing a minimum display-area unit in an area spread over the plurality of reception channels.

In addition, the display-configuration modification unit may be further operable to assign a priority level to each of various pieces of genre information in accordance with a display-configuration modification command, the pieces of genre information identifying the genre of a program; select one of a plurality of pieces of genre information for a program on the basis of the priority levels assigned to the pieces of genre information if the pieces of genre information pertain to the program; and change the display configurations of programs to a display configuration in which genres of the programs are displayed on the basis of the priority levels assigned to the pieces of genre information.

In addition, the display-configuration modification unit may be operable to assign a priority level to each piece of genre information and each background display configuration in accordance with a display-configuration modification command; and change the display configurations of programs to a display configuration in which the genre information and the background display configuration of each of the programs are displayed on the basis of the priority level assigned to the piece of genre information and the background display configuration.

In addition, the storage unit may include a first storage area operable to store first program-table data having a data configuration and a second storage area operable to store second program-table data having a data configuration different from the data configuration of the first program-table data; and the display-configuration modification unit may change the display configuration of the first program-table data stored in the first storage area and the display configuration of the second program-table data stored in the second storage area to a display configuration in which the first program-table data and the second program-table data are displayed on the same screen at the same time.

In addition, the storage unit may include a first storage area operable to store data of a program table of a satellite broadcast and a second storage area operable to store at least one of data of a program table of a ground wave broadcast and data of a web program table; and the display-configuration modification unit may change the display configuration of the data of a program table of a satellite broadcast stored in the first storage area and the display configuration of the at least one of the data of a program table of a ground wave broadcast and the data of a web program table stored in the second storage area to a display configuration in which the data of a program table of a satellite broadcast and the at least one of the data of a program table of a ground wave broadcast and the data of a web program table are displayed on the same screen at the same time.

In addition, if a first program of a satellite broadcast has a first genre having a first display configuration, and at least one of a second program of a ground wave broadcast and a web program has a second genre having a second display configuration, the second genre being the same as the first genre but the first display configuration being different from the second display configuration, the display-configuration modification unit may change at least one of the display configurations so that the first and second genres have a uniform display configuration.

In addition, if a command to enlarge a program of a displayed program table is received, the display-configuration modification unit may change the display configuration of the program to a display configuration in which the display of the program is enlarged.

In addition, in processing the command to enlarge the program, if a present enlargement stage has not reached a maximum enlargement stage, the display-configuration modification unit may increase the present enlargement stage by a predetermined stage increment to set the present enlargement stage at a higher level and may change the display configuration of the program table to a display configuration in which the program table is enlarged to an enlargement stage set at the higher level; and if the present enlargement stage has reached the maximum enlargement stage, the display-configuration modification unit may change the display configuration of the program table to a display configuration in which a message is displayed stating that the present enlargement stage has reached the maximum enlargement stage.

In addition, the display-configuration modification unit may gradually enlarge the display of the program by displaying a plurality of animations in a time period between a present enlargement stage and a next enlargement stage in a process to change the present enlargement stage to the next enlargement stage.

A program-display control method provided by the present invention includes storing program-table data having a predetermined display configuration; changing the display configuration of the stored program-table data to a new display configuration in accordance with a display-configuration modification command; creating data of a program table on the basis of the new display configuration and outputting the data to a predetermined display; and comparing a number of programs in a time frame with a maximum number of display lines that can be included in the time frame. If the number of programs in the time frame is smaller than the maximum number of display lines, the changing step includes finding a display-line count of each individual program in the time frame as a quantity proportional to a time duration of the individual program and allocating as many display lines to each individual program in the time frame as indicated by the display-line count found for the individual program in a descending-duration order starting with a program having a longest time duration. If the number of programs in the time frame is equal to the maximum number of display lines, the changing step includes allocating display lines composing a minimum display-area unit to each of the programs. If the number of programs in the time frame is greater than the maximum number of display lines, the changing step includes displaying an identifier for indicating that undisplayed programs exist and allocating remaining lines composing the minimum display-area unit to each of the programs in a descending-duration order starting with a program having a longest time duration.

In addition, if a shared-event program exists in a plurality of reception channels, the changing step may include changing the display configuration of the shared-event program to a display configuration in which the shared-event program is displayed in an area spread over the plurality of reception channels.

In addition, if a time frame of the shared-event program in any one of the plurality of reception channels does not overlap a time frame of the shared-event program in any other one of the plurality of reception channels, the changing step may include changing the display configuration of the shared-event program to a display configuration in which the shared-event program is displayed on display lines composing a minimum display-area unit in an area spread over the plurality of reception channels.

In addition, the changing step may include assigning a priority level to each of various pieces of genre information in accordance with a display-configuration modification command, the pieces of genre information identifying the genre of a program; selecting one of a plurality of pieces of genre information for a program on the basis of the priority levels assigned to the pieces of genre information if the pieces of genre information pertain to the program; and changing the display configurations of programs to a display configuration in which genres of the programs are displayed on the basis of the priority levels assigned to the pieces of genre information.

In addition, the changing step may include assigning a priority level to each piece of genre information and each background display configuration in accordance with a display-configuration modification command; and changing the display configurations of programs to a display configuration in which the genre information and the background display configuration of each of the programs are displayed on the basis of the priority level assigned to the piece of genre information and the background display configuration.

In addition, the storing step may include storing first program-table data having a data configuration in a first storage area and storing second program-table data having a data configuration different from the data configuration of the first program-table data in a second storage area; and the changing step may include changing the display configuration of the first program-table data stored in the first storage area and the display configuration of the second program-table data stored in the second storage area to a display configuration in which the first program-table data and the second program-table data are displayed on the same screen at the same time.

In addition, the storing step may include storing data of a program table of a satellite broadcast in a first storage area and storing at least one of data of a program table of a ground wave broadcast and data of a web program table in a second storage area; and the changing step may include changing the display configuration of the data of a program table of a satellite broadcast stored in the first storage area and the display configuration of the at least one of the data of a program table of a ground wave broadcast and the data of a web program table stored in the second storage area to a display configuration in which the data of a program table of a satellite broadcast and the at least one of the data of a program table of a ground wave broadcast and the data of a web program table are displayed on the same screen at the same time.

In addition, if a first program of a satellite broadcast has a first genre having a first display configuration, and at least one of a second program of a ground wave broadcast and a web program has a second genre having a second display configuration, the second genre being the same as the first genre but the first display configuration being different from the second display configuration, the changing step may include changing at least one of the first and second display configurations so that the first and second genres have a uniform display configuration.

In addition, if a command to enlarge a program of a displayed program table is received, the changing step may include changing the display configuration of the program to a display configuration in which the display of the program is enlarged.

In addition, in processing the command to enlarge the program, if a present enlargement stage has not reached a maximum enlargement stage, the changing step may include increasing the present enlargement stage by a predetermined stage increment to set the present enlargement stage at a higher level and changing the display configuration of the program table to a display configuration in which the program table is enlarged to an enlargement stage set at the higher level; and if the present enlargement stage has reached the maximum enlargement stage, the changing step may include changing the display configuration of the program table to a display configuration in which a message is displayed stating that the present enlargement stage has reached the maximum enlargement stage.

In addition, the changing step may include gradually enlarging the display of the program by displaying a plurality of animations in a time period between a present enlargement stage and a next enlargement stage in a process to change the present enlargement stage to the next enlargement stage.

BRIEF DESCRIPTION OF THE DRAWINGS

FIG. 1 is a rough block diagram showing the configuration of a program-display control apparatus implemented by a first embodiment of the present invention;

FIGS. 11A and 11B are diagrams showing typical changes of a display configuration in the second embodiment;

FIG. 12 is a rough block diagram showing the configuration of a program-display control apparatus implemented by a third embodiment of the present invention;

FIG. 13 shows a flowchart representing operations carried out by the third embodiment to execute program-display control;

FIG. 14 is a diagram showing a screen for setting genres in accordance with the third embodiment;

FIGS. 15A and 15B are each a diagram showing background colors of genres of programs in the third embodiment;

FIG. 16 is a rough block diagram showing the configuration of a television receiver implemented by a fourth embodiment of the present invention;

FIG. 17 is a diagram illustrating a reference table showing uniform genres for different broadcasts in the fourth embodiment;

FIG. 18 is a rough block diagram showing the configuration of a program-display control apparatus implemented by a fifth embodiment of the present invention;

FIGS. 26A to 26C are diagrams showing a typical calculation of an enlarged area in the sixth embodiment;

FIG. 28 is a diagram showing an increase in the amount of information as an increase accompanying program enlargement in the sixth embodiment;

FIG. 32 is a diagram showing typical animation displays of an enlargement of a program table in the sixth embodiment.

DETAILED DESCRIPTION

Figure 2:
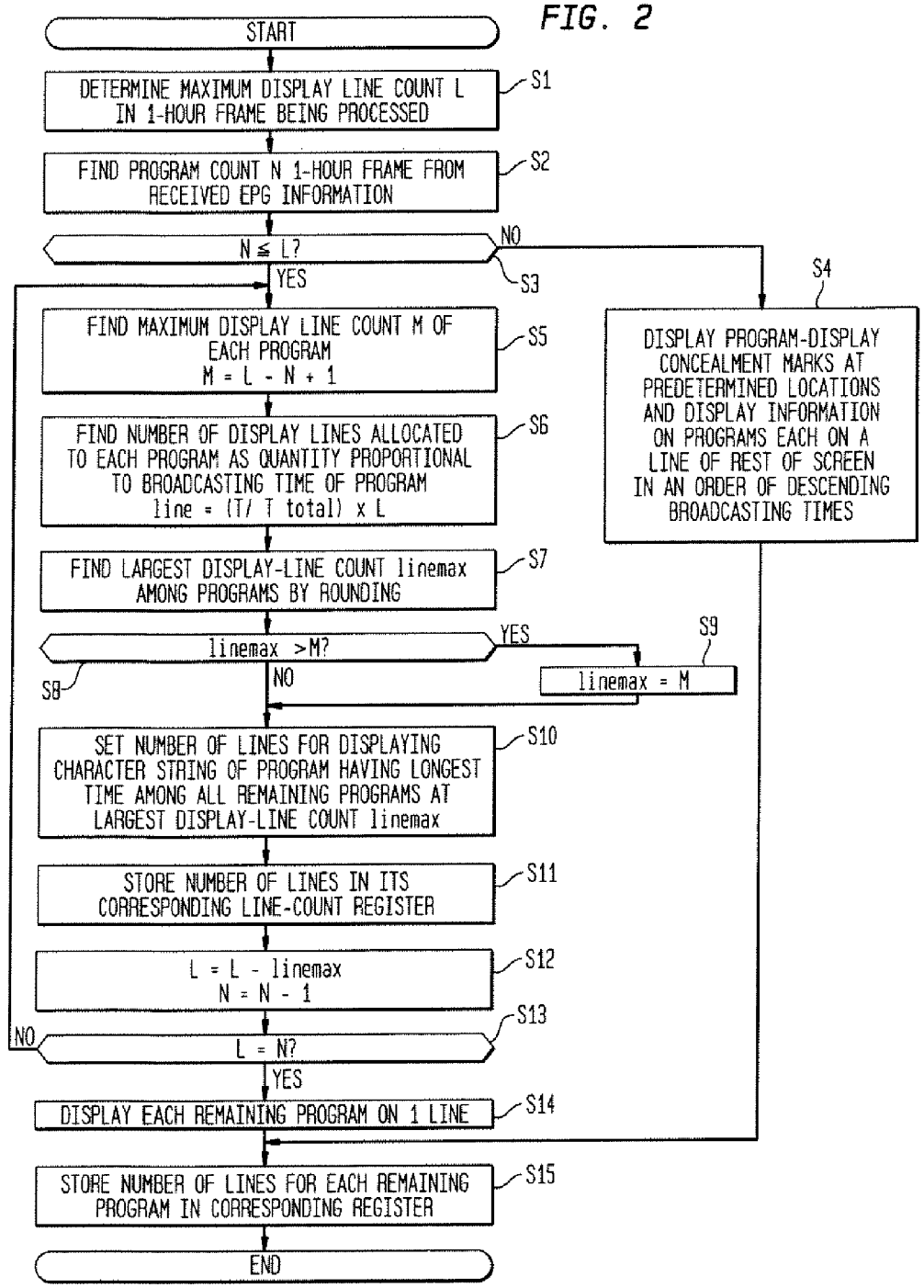
FIG. 2 shows a flowchart representing operations carried out by the first embodiment to execute program-display control.

By taking a television receiver for receiving BS digital broadcasts (satellite broadcasts), ground wave broadcasts and/or web distributions as an example, the following description explains program-display control apparatus implemented by first to fifth embodiments of the present invention with reference to the drawings.

First Embodiment

FIG. 1 is a rough block diagram showing the configuration of a part of a television receiver in a first embodiment of the present invention. As shown in FIG. 1, a BS antenna 1 receives the radio waves of a BS digital broadcast and supplies the radio waves to a BS digital tuner 2. The BS digital tuner 2 demodulates the radio waves received from the BS antenna 1 and separates an audio/video signal and EPG information from each other. By the EPG information, data of a program table is implied. Since the audio/video signal is a compressed signal, it is decompressed in a predetermined decoder, which is not shown in the figure. The data of the program table is stored in a first program-table data memory 3 (first storage means). On the other hand, a ground wave antenna 4 receives the radio waves of a ground wave broadcast, supplying the radio waves to a program-table tuner 5 and an audio/video tuner 6. The program-table tuner 5 demodulates the EPG information and stores the demodulated EPG information in a second program-table data memory 7 (second storage means). By the same token, the EPG information received from a web line is also stored in the second program-table data memory 7 (the second storage means). The audio/video tuner 6 carries out a signal process in a predetermined signal-processing unit which is also not shown in the figure.

A program-table creation unit 8 (program-table creation means) generates display data on the basis of the program-table data received from the first program-table data memory 3 as well as the second program-table data memory 7, outputting the display data to a picture synthesis unit, an NTSC encoder and display means, which is typically a monitor. The picture synthesis unit, the NTSC encoder and the display means are also not shown in the figure. More particularly, the program-table creation unit 8 creates display data for displaying both a program table of a satellite broadcast or a BS digital broadcast and either a program table of a ground wave broadcast or a web program table at the same time on the monitor on the basis of program-table data received from the first program-table data memory 3 (the first storage means) and on the basis of program-table data received from the second program-table data memory 7 (the second storage means), respectively, outputting the created display data to the display means which is not shown in the figure as described above.

In conjunction with control means not shown in the figure, a display-configuration modification unit 9 reads out program-table data from the first program-table data memory 3 and the second program-table data memory 7, and changes the display configurations of the program-table data. Typically, the control means is a CPU. A character-string register 10 serves as a register for temporarily storing data of a character string to be processed by the display-configuration modification unit 9.

A program table displayed on the monitor employed in the television receiver shows information on programs, a variety of menu icons and a cursor, which is typically an inverted display of the icons. The user is allowed to make a program reservation and carry out an operation unique to the present invention by using a remote controller. The television receiver employs the aforementioned control means for controlling the entire television receiver and a variety of other configuration elements. However, the control means and the other configuration elements each have an ordinary configuration and are not directly related to the present invention. For this reason, their explanation is omitted and they are shown in none of the figures.

The following description explains the operations carried out to execute a program-display control method provided by the first embodiment. FIG. 2 shows a flowchart representing the operations carried out by the display-configuration modification unit 9 to execute the program-display control method. FIGS. 3A to 6B are diagrams each showing a picture displayed on the monitor shown in none of the figures as a picture of a program table. It is to be noted that the program-table control is executed for each channel.

The flowchart shown in FIG. 2 begins with step S1 to determine a maximum display line count L representing the maximum number of display lines in the one-hour frame being processed. If a plurality of programs exist in the one-hour frame, a character string on a line is taken as the minimum unit of an area for displaying any one of the programs. Then, at the next step S2, a program count N representing the number of programs included in the time frame is found from received EPG information.

Subsequently, at the next step S3, the value of N is compared with the value of L to determine whether the value of N is smaller than or equal to the value of L. If the value of N is greater than the value of L, information on the programs cannot be displayed for all the programs. In such case, the flow of the control goes on to step S4 at which program-display concealment marks are displayed at predetermined locations. The program-display concealment marks each indicate that some programs that cannot be displayed exist. Pieces of information on programs are each displayed on a line of the rest of the screen in descending broadcasting time order (and in an order of earlier starting time). However, the first and last programs in this one-hour frame are always displayed.

If the value of N is smaller than or equal to the value of L, on the other hand, information on each of the programs can be displayed on at least a line. In this case, the flow of the control goes on to step S5 at which a maximum display line count M for a program is found in accordance with the equation given below. The maximum display line count M is the maximum number of display lines which a character string representing information on a program is allowed to occupy.

$$M = L - N + 1$$

Since a character string for each of the programs can be displayed on at least a line, the value of the difference (L−N) is the number of display lines remaining after a line is allocated to each of the programs. Thus, the maximum display line count M is the sum of the number of remaining lines and 1.

Then, at the next step S6, the number of display lines allocated to each of the programs is found as a quantity proportional to the broadcasting time of the program in accordance with the following equation:

$$\text{line} = (T/T\text{total}) \times L$$

where notation 'line' denotes the number of display lines allocated to a program, symbol T denotes the broadcasting time of the program and symbol Ttotal denotes the broadcasting time of the entire frame. In this case, since Ttotal is 60 minutes, the above equation can be rewritten as follows:

$$\text{line} = (T/60) \times L$$

Then, at the next step S7, a largest display-line count linemax among the display-line counts (line) for the programs is found by rounding. Subsequently, at the next step S8, the largest display-line count linemax is compared with the maximum display line count M to determine whether or not the largest display-line count linemax is greater than the maximum display line count M.

If the largest display-line count linemax is greater than the maximum display line count M, the largest display-line count linemax is replaced with the maximum display line count M at step S9. If the largest display-line count linemax is not greater than the maximum display line count M, on the other hand, the largest display-line count linemax is not replaced with the maximum display line count M, but is used as is in displaying information on a program. Then, at the next step S10, the number of display lines for displaying the character string of a program having the longest time among all the remaining programs is set at the largest display-line count linemax. Subsequently, at the next step S11, this number of display lines is stored in its corresponding line-count register. Assume, for example, that the program having the longest time among all the remaining programs is program (i). In such case, the largest display-line count linemax is stored in the corresponding line-count register.

Then, at the next step S12, the values of L and N are updated in accordance with the following equations:

$$L = L - \text{linemax}$$

$$N = N - 1$$

That is to say, the value of L is updated to the number of display lines remaining in the one-hour frame, that is, the number of usable remaining lines. In addition, since the line count of a program has been set at step S10, this program is excluded from the number of presently remaining programs by decrementing the value of N.

Subsequently, at the next step S13, the value of L is compared with the value of N to determine whether the value of L is equal to the value of N, that is, whether the usable-line count L is equal to the remaining-program count N. If the usable-line count L is equal to the remaining-program count N, each of the remaining programs is displayed on one line at step S14. Then, at the next step S15, the number of display lines for each of the remaining programs is stored in a register for the respective program. Finally, the execution of the control represented by this flowchart is ended. In the case of a program for which a program-display concealment mark is displayed at step S4, a line count of 0.5 is stored in a register for this program at step S15. On the other hand, a line count of 1 is stored in a register for each other program.

If the usable-line count L is found to be unequal to the remaining-program count N at step S13, that is, the usable-line count L is greater than the remaining-program count N, on the other hand, the presently remaining programs include at least a program to which two or more lines for writing a character string can be allocated. In this case, the flow of the control goes back to step S5 to execute a loop between this step and step S13 repeatedly until the value of L becomes equal to the value of N.

It is to be noted that the decremented value of N may become equal to 0 as is the case with the following example. Assume that the line count L in the one-hour frame is 6 and the program count N in the same frame is 2 representing programs A and B. Let the time durations of programs A and B be 36 and 24 minutes respectively. In this case, four lines are allocated to program A. Then, in a second loop, the remaining two lines are allocated to program B. After the remaining two lines are allocated to program B, the decremented value of N becomes equal to 0 at step S12, indicating that there is no longer a remaining program. Thus, the processes of steps S14 and S15 are not carried out. That is to say, it is possible to provide a configuration in which, when the decremented value of N becomes equal to 0 at step S12, the execution of the control represented by this flowchart is ended.

Next, the program-display control represented by the flowchart shown in FIG. 2 is explained for some program examples shown in FIGS. 3A to 5B. It is to be noted that, for these program examples, the maximum display-line count L for the one-hour frame is set at a typical value of 6.

Figure 3A:
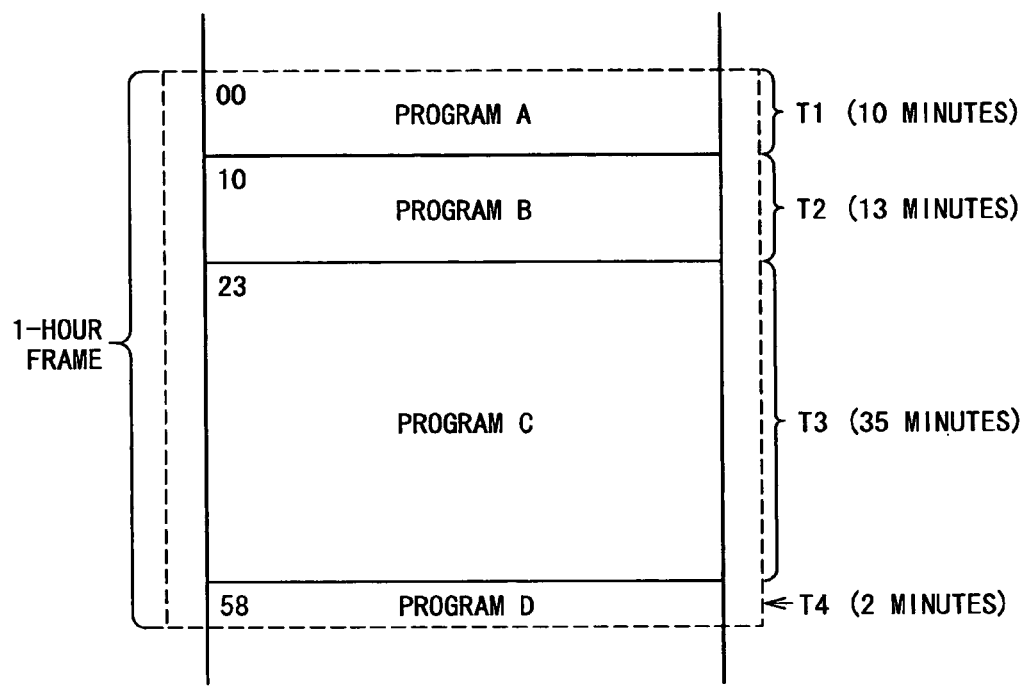
FIGS. 3A and 3B are diagrams showing typical changes of a display configuration in the first embodiment.

In the case of the program examples shown in FIG. 3A, there are programs A, B, C and D in the one-hour frame, or N=4. The broadcasting time frames T1, T2, T3 and T4 allocated to the programs are 10, 13, 35 and 2 minutes, respectively. In this case, the value of M is found at step S5 as follows:

$M=6-4+1=3.$

Then, the number of display lines allocated to each of the programs is found as a quantity proportional to the broadcasting time of the program as follows:
For program A: line=10/60×6=1
For program B: line=13/60×6=1.3
For program C: line=35/60×6=3.5
For program D: line=2/60×6=0.2

Figure 3B:
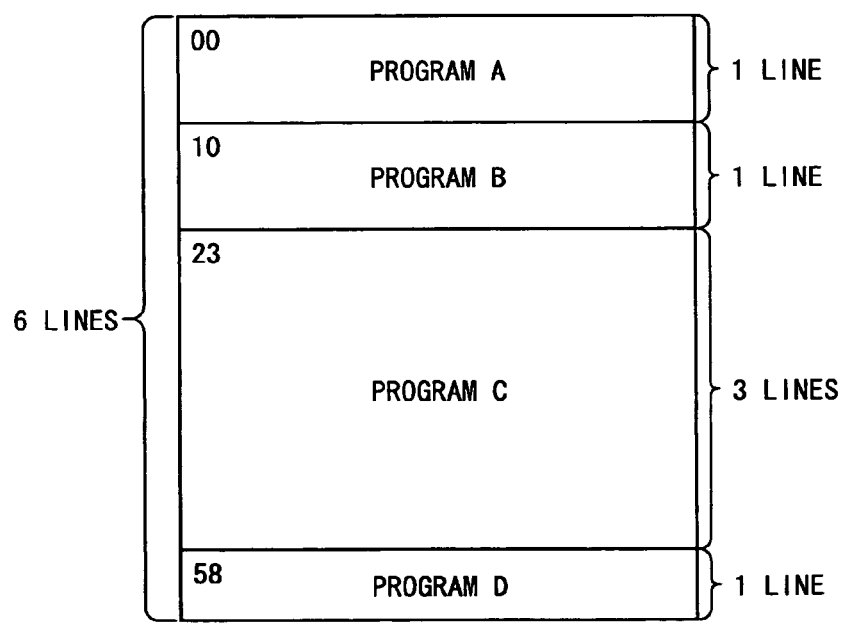

Then, at the next step S7, a largest display-line count linemax among the display-line counts (line) for the programs is found by rounding to be 4 for program C. Since linemax is greater than the M value of 3, linemax is replaced with 3 at the step S9. As a result, three lines are allocated to program C. Then, as a result of the computation carried out at step S12, the values of L and N both become 3. Thus, the flow of the control goes on from step S13 to step S14 at which a one-line character string is allocated to each of the remaining programs A, B and D. The resulting program table is shown in FIG. 3B.

Figure 4A:
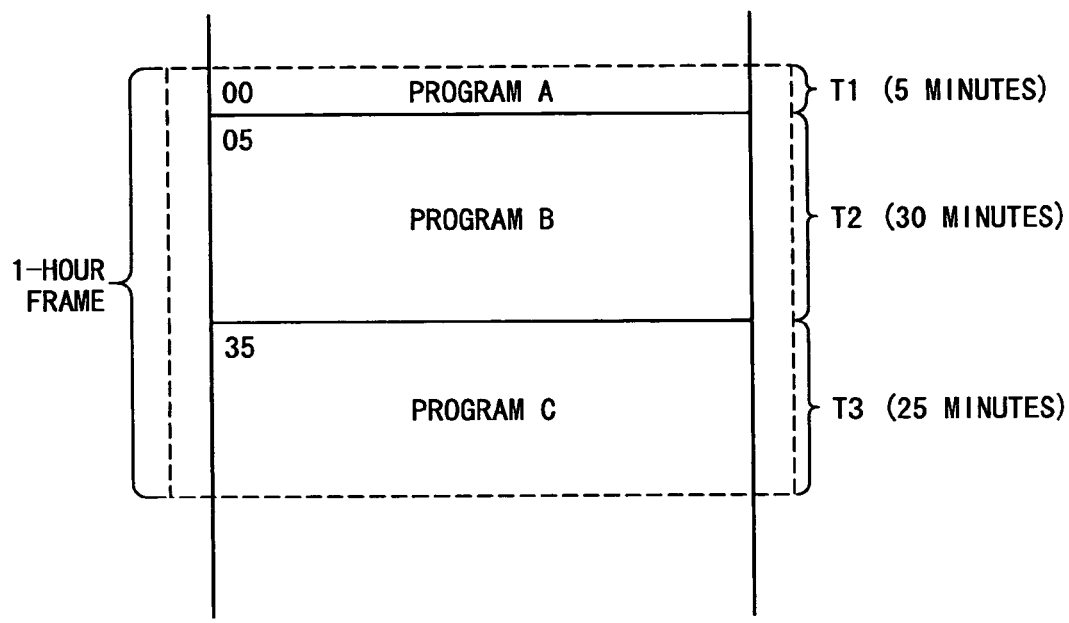
FIGS. 4A and 4B are diagrams showing typical changes of a display configuration in the first embodiment.

In the case of the program examples shown in FIG. 4A, there are programs A, B and C in the one-hour frame, or N=3. The broadcasting time frames T1, T2 and T3 allocated to the programs are 5, 30 and 25 minutes, respectively. In this case, the value of M is found at step S5 as follows:

$M=6-3+1=4.$

Then, the number of display lines allocated to each of the programs is found as a quantity proportional to the broadcasting time of the program as follows:
For program A: line=5/60×6=0.5
For program B: line=30/60×6=3
For program C: line=25/60×6=2.5

Then, at the next step S7, a largest display-line count linemax among the display-line counts (line) for the programs is found by rounding to be 3 for program B. Since linemax is less than the M value, linemax of 3 is used as is. As a result, three lines are allocated to program B. Then, as a result of the computation carried out at step S12, L (=3) is found greater (>) than N (=2). In this case, the flow of the control goes from step S13 back to step S5 to repeat a loop between this step and step S13.

As a result, the values of M, L and N become 2, 3 and 2, respectively. Thus, the number of display lines allocated to each of the remaining programs A and C is found as a quantity proportional to the broadcasting time of the program as follows:
For program A: line=5/30×3=0.5
For program C: line=25/30×3=2.5

Figure 4B:
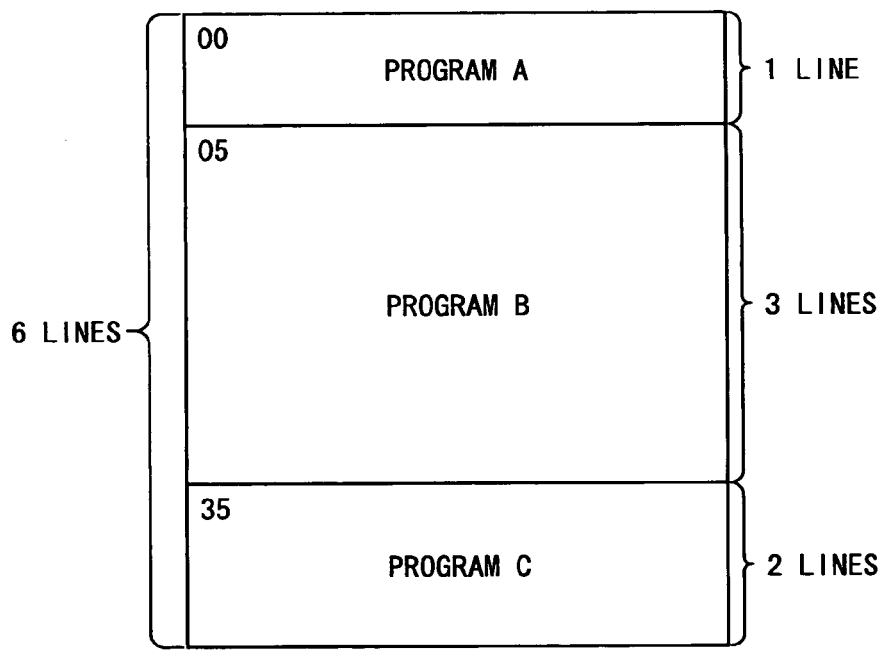

Then, at the next step S7, a largest display-line count linemax among the display-line counts (line) for the remaining programs is found by rounding to be 3 for program C. Since linemax is greater than the M value of 2, linemax is replaced with 2 at step S9. As a result, 2 lines are allocated to program C. Then, as a result of the computation carried out at step S12, a 1-line character string is allocated to remaining program A. A resulting program table is shown in FIG. 4B.

Figure 5A:
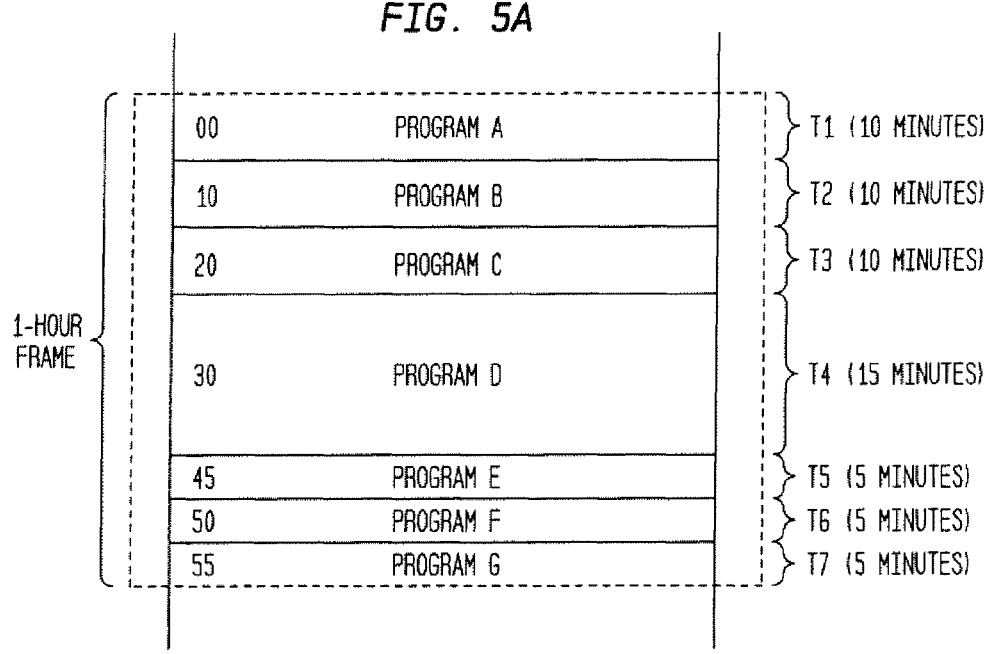
FIGS. 5A and 5B are diagrams showing typical changes of a display configuration in the first embodiment.
Figure 5B:
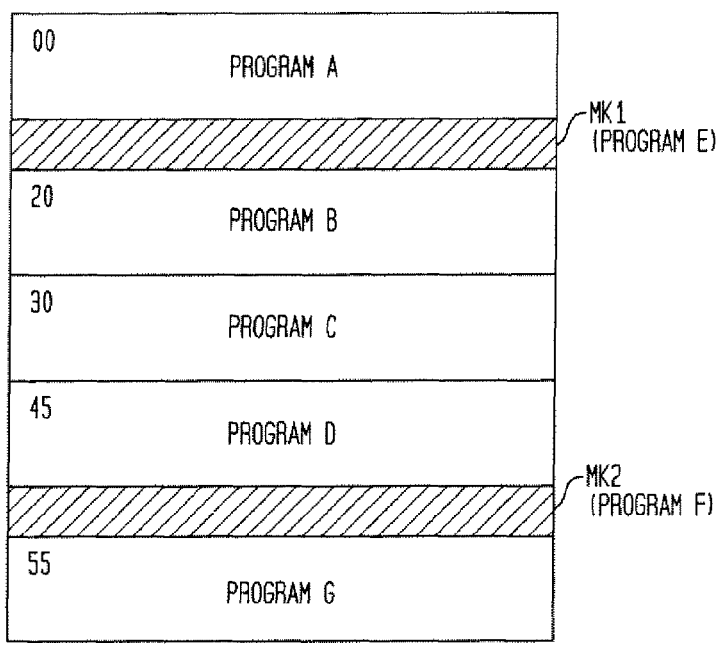

In the case of the program examples shown in FIG. 5A, there are programs A, B, C, D, E, F and G in the 1-hour frame, or N=7. The broadcasting time frames T1, T2, T3, T4, T5, T6 and T7 allocated to the programs are 10, 10, 10, 15, 5, 5 and 5 minutes, respectively. In this case, the maximum display line count L of 6 indicating the maximum number of display lines in the one-hour frame is smaller than the program count N of 7 representing the number of programs included in the time frame. Thus, the flow of the control goes from step S3 to step S4 at which program-display concealment marks are displayed at predetermined locations. Then, programs are each displayed on a line in descending-duration order starting with the program having the shortest time duration. In this case, however, the first program A and last program G are each displayed on a line. As a result, a program table displayed as shown in FIG. 5B includes program-display concealment marks MK1 and MK2 representing programs E and F, respectively.

As described above, with the conventional display configuration of a program frame or a time frame, information on a program having a short broadcasting time cannot be displayed. In accordance with the first embodiment, however, the conventional display configuration is changed to a display configuration in which the amount of information on each program is increased by widening the display area allocated to the program. Thus, it is possible to provide an effect of a capability of displaying information on each program in a format that can be recognized by the user with ease without being restricted to the display configuration of the program display data included in a received television broadcast signal.

Figure 6A:
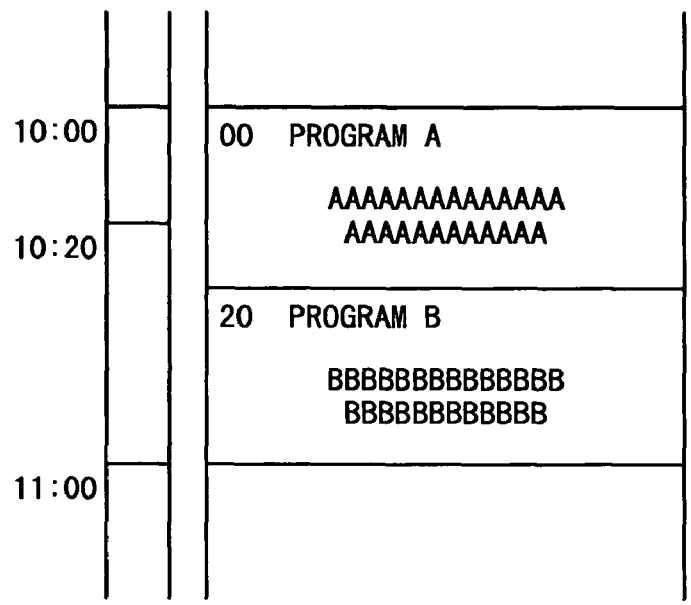
FIGS. 6A and 6B are diagrams showing typical changes of a display configuration in the first embodiment.
Figure 6B:
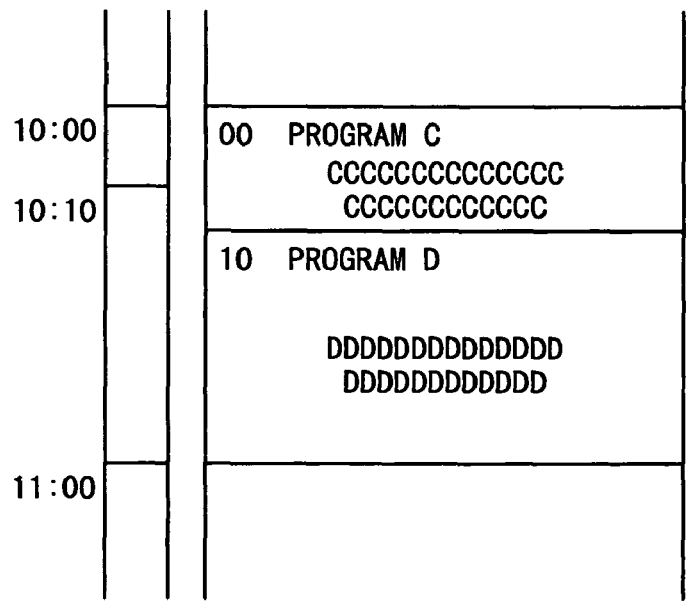
Figure 33A:
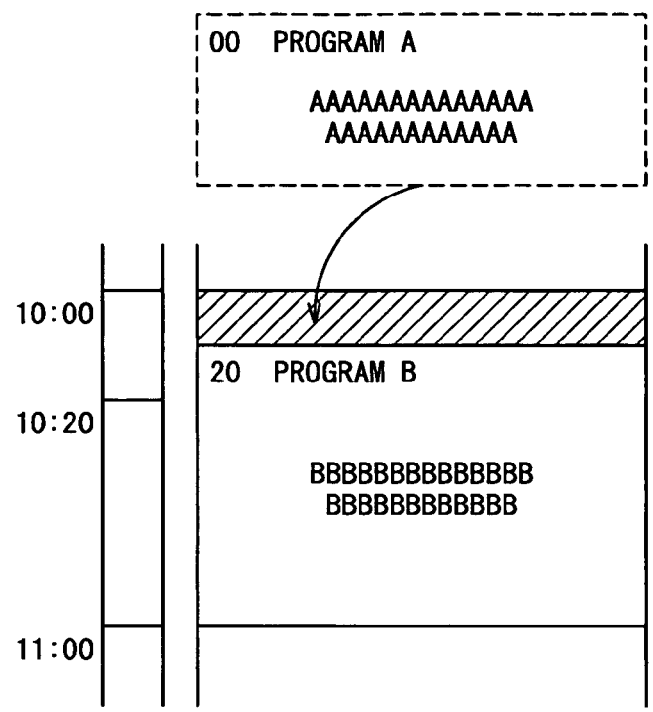
FIGS. 33A and 33B are each a diagram showing the typical conventional display configuration of a program table.
Figure 33B:
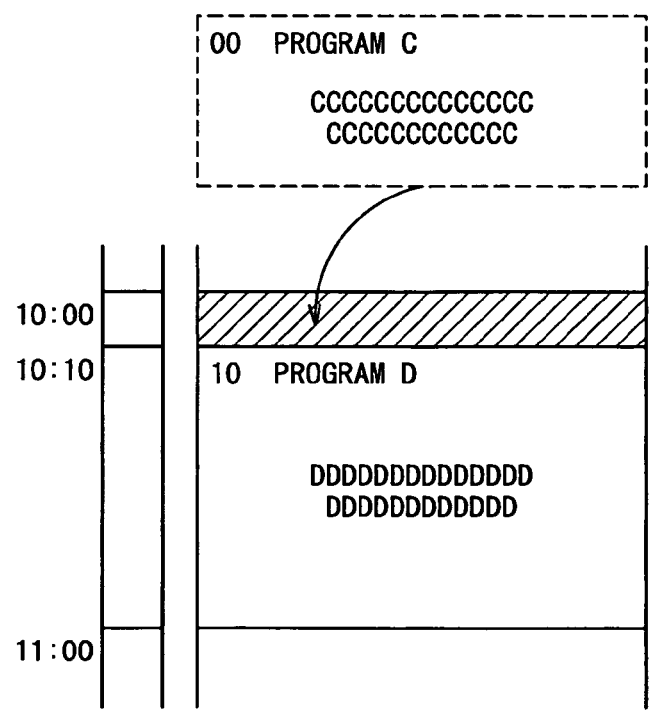

For example, by executing the program-display control provided by the first embodiment, display areas allocated to programs A and C in typical conventional displays shown in FIGS. 33A and B, respectively, are enlarged to allow character strings describing information on programs A and C to be displayed in the enlarged areas as shown in FIGS. 6A and 6B, respectively.

Second Embodiment

The following description explains a second embodiment for displaying a program table showing a program of a shared event as a program received through a plurality of channels. The second embodiment is an application of the program-display control apparatus implemented by the first embodiment shown in FIG. 1. The second embodiment is also an application of the program-display control, which is represented by the flowchart shown in FIG. 2, as control adopted by the program-display control apparatus. With BS digital broadcasts, a program of a shared event can be transmitted through a plurality of channels. In such case, since the band of the radio wave is broadened by the number of used channels, a picture having a high quality can be presented. The second embodiment is capable of reflecting a high-quality program of a shared event in a program table.

Figure 7:
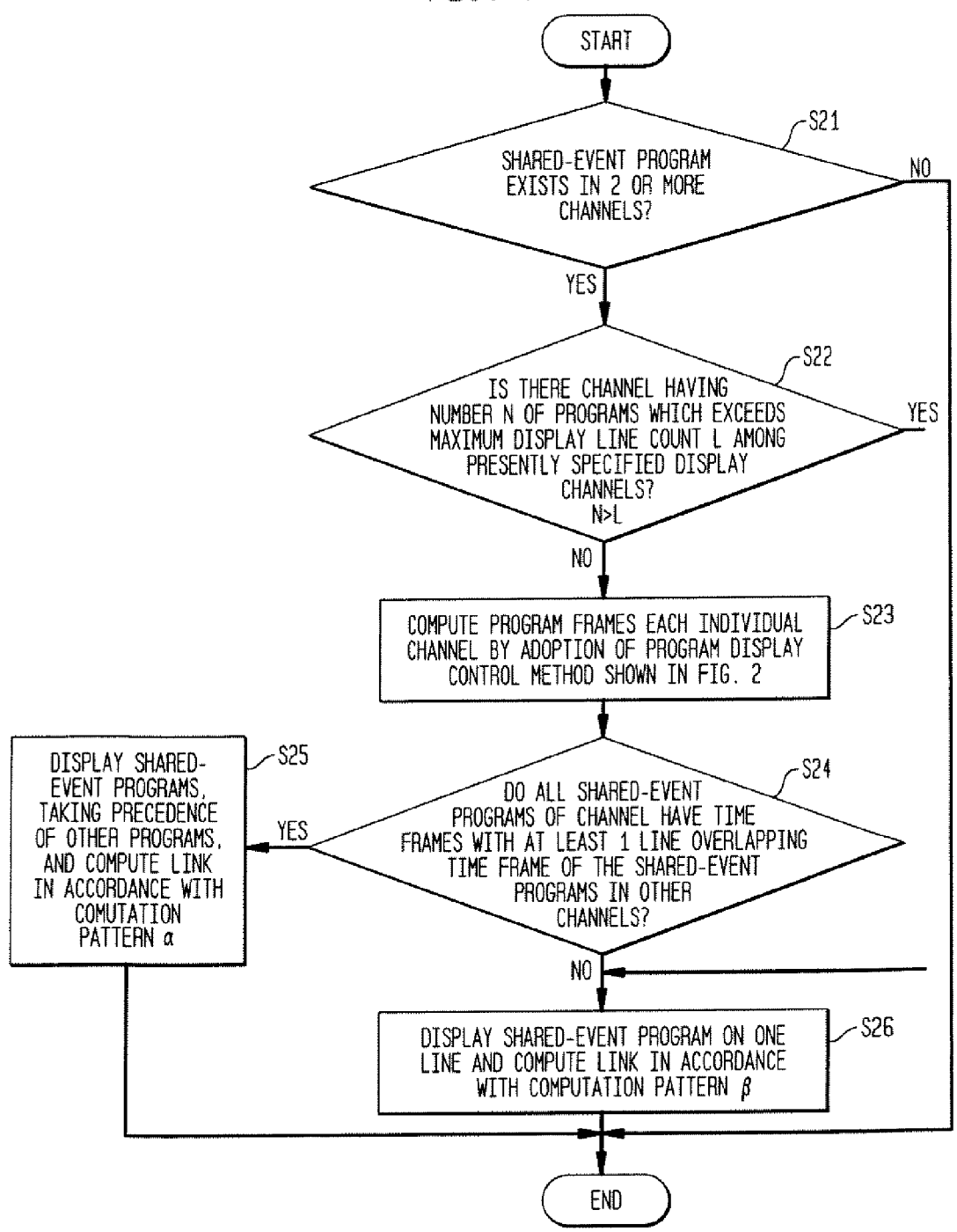
FIG. 7 shows a flowchart representing operations carried out by a second embodiment of the present invention to execute program-display control.

FIG. 7 shows a flowchart representing operations carried out by the second embodiment of the present invention to execute a program-display control method of displaying a program of a shared event. The flowchart begins with step S21 to determine whether a program of a shared event exists in 2 or more channels by, typically, searching program tables received through channels of the BS digital broadcasting along the time base for a program of an event shared by the channels. If a program of a shared event is found in the search, an event-sharing flag is set to an active state to notify there is another channel sharing the event.

In this case, the flow of the control then goes on to step S22 to determine whether the display channels, that is, a plurality of presently specified channels, each include programs, the number of which exceeds the maximum display line count. If the number of programs in each of the channels does not exceed the maximum display line count, at step S23, program frames are computed for each individual channel by adoption of the program display control method shown in FIG. 2, which is the program display control method provided by the first embodiment as described earlier. It is to be noted that the unit of the result of the computation is 0.5 lines. This is because it is necessary to consider the case in which 0.5-line program-display concealment marks are inserted into the display.

Then, the flow of the control goes on to step S24 to determine whether all shared-event programs of a channel have time frames overlapping the time frames of the shared-event programs in other channels. If all shared-event programs of a channel have time frames overlapping the time frames of the shared-event programs in the other channels, the flow of the control goes to step S25 at which the shared-event programs are displayed, taking precedence of other programs. In addition, a link for such a case is computed in accordance with computation pattern α. In accordance with computation pattern α, program frames of the overlapping time frames of the shared-event programs are linked to each other.

If even a single shared-event program of a channel exists with the time frame thereof not overlapping the shared-event program in other channels, the flow of the control goes to step S26 at which the shared-event program is displayed on one line. In addition, a link for such a case is computed in accordance with computation pattern β. In accordance with computation pattern β, the number of programs between 00 minutes of the one-hour frame and the first shared-event program is first computed. Then, by taking the number of such programs as a reference, the positions of the programs are adjusted by using program-display concealment marks. By carrying out these processes repeatedly, programs are displayed one after another. If the number of programs is greater than the maximum display-line count L, programs succeeding shared-event programs are each displayed as a program-display concealment mark. If a plurality of shared-event programs exist in the one-hour frame with the shared-event programs separated from each other by another program, the number of program-display concealment marks becomes odd, making it impossible to match the maximum display line count L of the one-hour frame. In this case, the positions of programs are adjusted by displaying a shared-event program on 1.5 lines.

By referring to the examples shown in FIGS. 8A to 10B, the following description explains a case of displaying a program table including a shared-event program received through a channel as a program having a time frame overlapping the time frames of the shared-event program in other channels. In each of the examples, the maximum display line count of a one-hour frame is six. Assume, for example, that the channels broadcasting shared-event programs are two channels, i. e., channels 141 and 142.

Figure 8A:
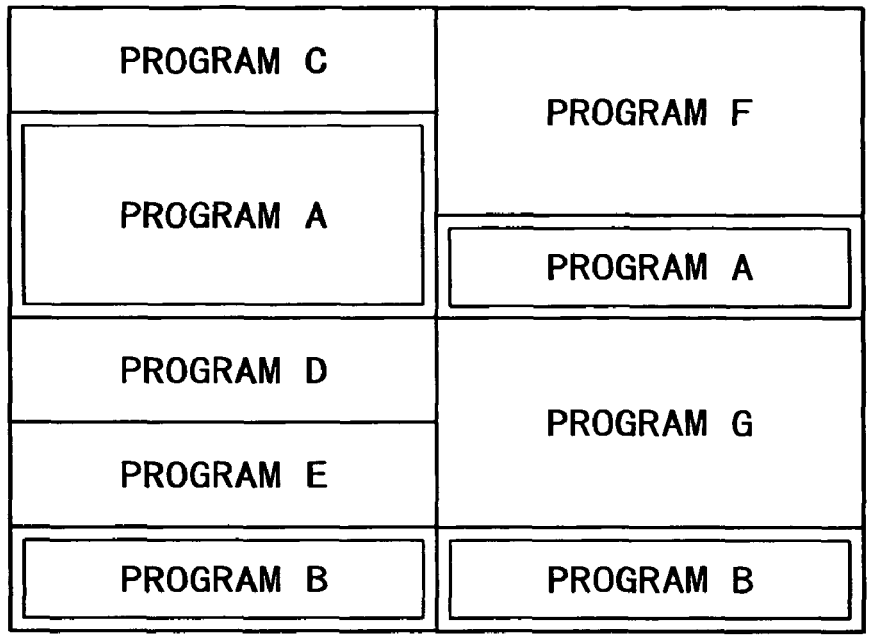
FIGS. 8A and 8B are diagrams showing typical changes of a display configuration in the second embodiment.
Figure 8B:
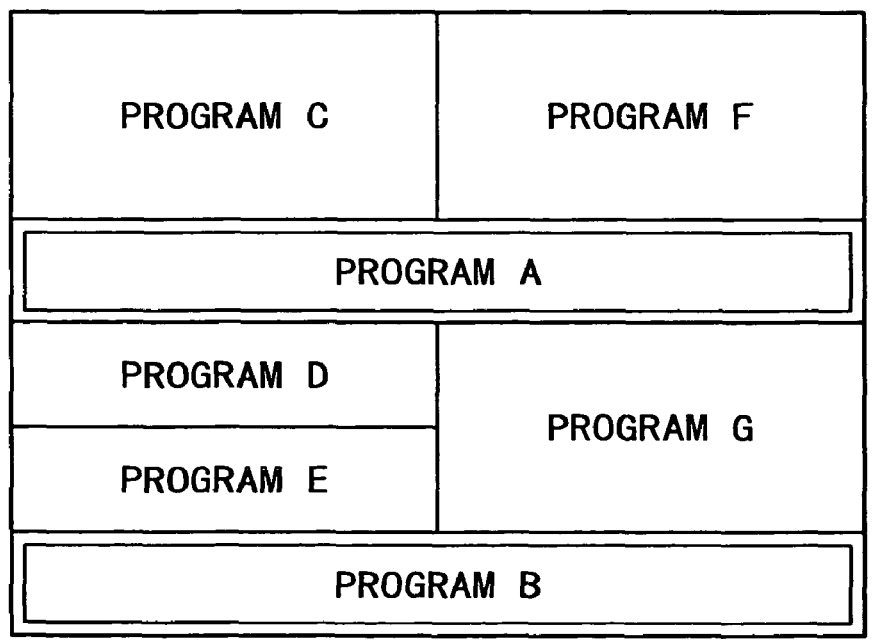

In the example shown in FIG. 8A, the two channels, namely, channels 141 and 142, include programs A and B as shared-event programs, and neither of the channels includes a number of programs which exceeds the maximum display line count of six. Thus, the flow of the control goes from step S21 to step S23 by way of step S22. At step S23, program frames are computed for every channel. In addition, program A in channel 141 has a time frame overlapping the time frame of program A in channel 142 and, by the same token, program B in channel 141 also has a time frame overlapping the time frame of program B in channel 142. Thus, the flow of the control goes from step S24 to step S25 at which program frames are computed in accordance with computation pattern α. That is to say, programs of channel 141 are linked to programs of channel 142 by program frames in the overlapping time frames of the shared-event programs. As for the remaining programs, the size of every program frame is computed for a program group or each of a plurality of different program groups by carrying out the processes of step S10 and the subsequent steps in the flowchart shown in FIG. 2 as a flowchart representing the program display control explained earlier. A program group may include the remaining programs between 00 minutes of the one-hour frame and the first shared-event program, programs between the end time of the first shared-event program and the start time of the next shared-event program or programs between the end time of the last shared-event program and the end time of the one-hour frame. As a result, the program table shown in FIG. 8B is obtained. As shown in the figure, the program table has a display configuration in which programs A and B are spread over the portions of the two channels.

Figure 9A:
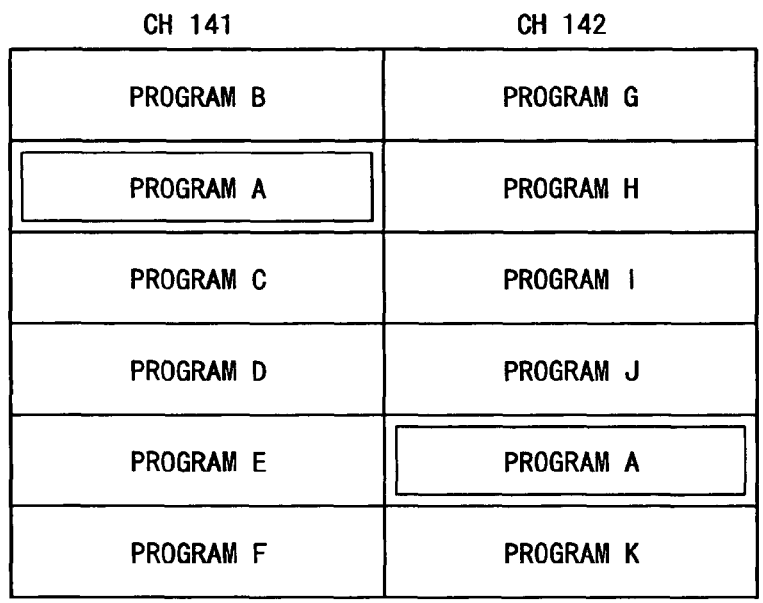
FIGS. 9A and 9B are diagrams showing typical changes of a display configuration in the second embodiment.
Figure 9B:
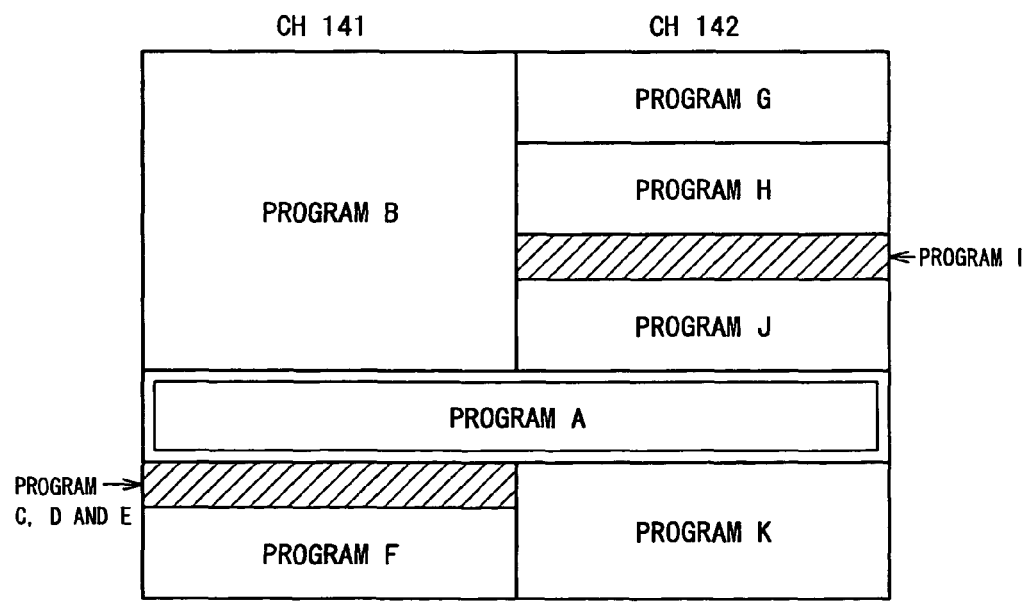

In the case of the example shown in FIG. 9A, the two channels, i. e., channels 141 and 142, include program A as a shared-event program. However, the time frame of the shared-event program included in one of the channels is different from the time frame in the other channel. Thus, the flow of the control goes from step S24 to step S26 at which program frames are computed in accordance with computation pattern β. That is to say, shared-event program A is displayed on a line and program frames of the remaining programs are computed by carrying out the program-display control process represented by the flowchart shown in FIG. 2. As a result, programs C, D and E of channel 141 and program I of channel 142 are each displayed as a program-display concealment mark used for position adjustment as shown in FIG. 9B.

Figure 10A:
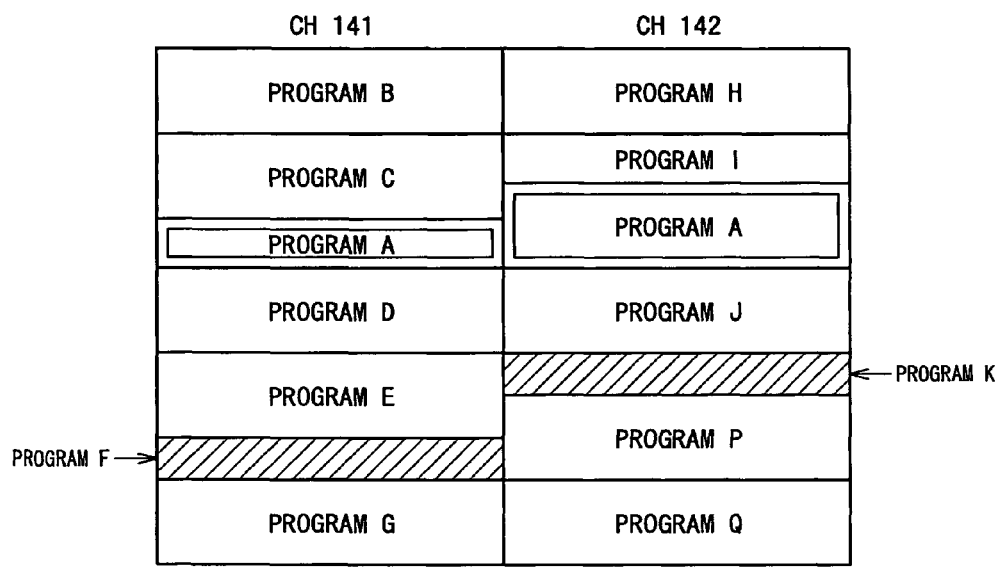
FIGS. 10A and 10B are diagrams showing typical changes of a display configuration in the second embodiment.
Figure 10B:
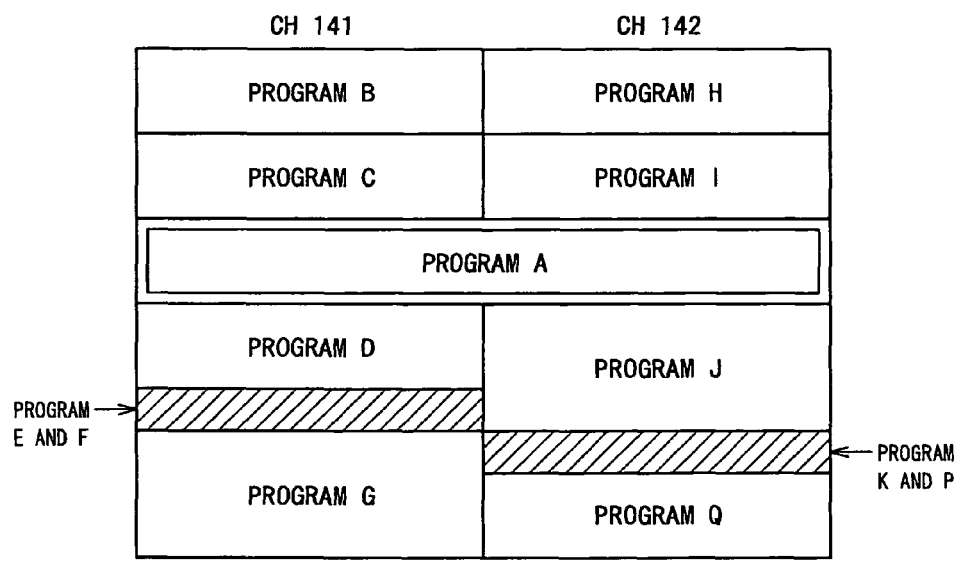

In the case of the example shown in FIG. 10A, the two channels, i. e., channels 141 and 142, include program A as a shared-event program. However, the number of programs in each of the channels is seven, which is greater than the maximum display-line count of six for the channels. It is to be noted that, in this case, pieces of information on program A serving as the shared-event program and program F other than program A in channel 141 and information on programs I and K in channel 142 are not displayed. Since the number of programs is greater than the maximum display-line count, the flow of the control goes on from step S22 to step S26 at which program frames are computed in accordance with computation pattern β. That is to say, shared-event program A is displayed on a line and program frames of the remaining programs are computed by carrying out the processing of step S10 and subsequent steps of the program-display control method represented by the flowchart shown in FIG. 2. As a result, programs E and F of channel 141 and programs K and P of channel 142 are each displayed as a program-display concealment mark used for position adjustment as shown in FIG. 10B.

As described above, in accordance with the second embodiment, if a plurality of receiving channels include a shared-event program, the shared-event program is displayed in an area spread over program-display areas allocated to the channels. Thus, the second embodiment provides an effect that information on programs can be displayed by placing emphasis on this special shared-event program and reflecting this special program in the program table in a state that can be recognized by the user with ease.

The second embodiment has a display configuration in which two channels have shared-event programs as described above. It is to be noted that the above description can also be applied to a display configuration in which three or more channels have shared-event programs. In such case, if channels having a shared-event program are adjacent to each other, the program is displayed in a contiguous (seamless) area spread over areas allocated to the channels. As a matter of fact, there are many cases in which an event is shared by adjacent channels.

Assume, for example, that three adjacent channels 141, 142 and 143 are used for broadcasting shared-event program D as shown in FIG. 11A. In this case, since program D is displayed in an area spread over areas allocated to the three channels, there is exhibited an effect that the event sharing of the program can be recognized by the user with ease. In addition, even in an attempt to scroll the screen by moving a cursor in the channel direction to display portions of other channels in the same time frame, the screen can be scrolled at a small number of cursor movements in comparison with a display screen in which program D is displayed in each of the areas allocated to the adjacent channels, as shown in FIG. 11B.

Third Embodiment

Next, a third embodiment of the present invention is explained by referring to FIGS. 12 to 14. FIG. 12 is a rough block diagram showing the configuration of a program-display control apparatus implemented by the third embodiment. In the configuration shown in FIG. 12, configuration elements identical with their counterparts included in the configuration of the first embodiment shown in FIG. 1 are denoted by the same reference numerals as the counterparts, and their explanations are not repeated. In collaboration with control means not shown in the figure, a genre priority-level processor 11 (display-configuration modification means) reads out program-table data from the first program-table data memory 3 and the second program-table data memory 7, changing the display configuration of the data. The control means typically includes a CPU. A user priority-level memory 12 is used for storing priority levels of genres selected by the user.

A program may include mixed content of a plurality of genres. Even in the case of such a program, transmitted EPG information of a ground wave broadcast includes display data of information on only 1 genre for the program. An example of the information on only 1 genre is information on the genre of the representative content of the program. In the case of EPG information of a BS digital broadcast, on the other hand, for a program including mixed content of a plurality of genres, display data of information on up to three genres is transmitted. Since the order of the transmitted pieces of genre information is not specially prescribed, however, the pieces of genre information are transmitted in an order unrelated to a broadcast order of the genres in the program.

The following description explains operations carried out to execute a program-display control method adopted in the third embodiment. FIG. 13 shows a flowchart representing a genre priority-level process carried out by a genre priority-level processor 11. The flowchart shown in FIG. 13 begins with step S31 at which a genre-setting dialog is displayed on a monitor. For each genre, the genre-setting dialog shows a background color or pattern of a program table as a color or a pattern that can be specified, as shown in FIG. 14. The background color or the background pattern is jointly referred to hereafter simply as a background color. Then, at the next step S32, a pointer n pointing to a priority level is set at 1 representing the highest priority level. Subsequently, processing in a loop consisting of steps S33 to S36 is carried out repeatedly by incrementing the value of the pointer n for each execution of the loop.

The loop begins with step S33 to determine whether the user has carried out an operation of a remote controller to specify a genre and its background color. If a genre and its background color have been specified, the genre and its background color are stored in a register P (n, j, k) of the user priority-level memory 12 at step S34, where symbol j denotes a number assigned to the specified genre and symbol k denotes a number assigned to the specified background color. Then, at the next step S35, the value of the pointer n is incremented. Subsequently, at the next step S36, the value of the pointer n is compared with a maximum value nmax of the genre priority level to determine whether the value of the pointer n is greater than the maximum value nmax. In this embodiment, the maximum value nmax is set at a typical value of 3. If the value of the pointer n is not greater than the maximum value nmax, the flow of the control goes back to step S33 to determine whether the user has carried out an operation to specify a next genre and its background color. If the value of the pointer n is greater than the maximum value nmax, on the other hand, the execution of the control represented by this flowchart is ended. FIG. 15A is a diagram showing pieces of information on selected genres each having an assigned priority level. These pieces of information are typically displayed at the bottom of the screen as a part of the screen in an order according to the priority levels assigned to the genres, as shown in FIG. 15B.

It is to be noted that, if ordinary genre background colors are specified, a table associating numbers assigned to specified genres with numbers assigned to specified background colors is stored in a register of the first program-table data memory 3. For example, different background colors can be specified for up to five different genres. In this case, data associating the five genres with their background colors is stored in the register of the first program-table data memory 3. Thus, if information on prioritized genres is specified in the processing represented by the flowchart shown in FIG. 13 and includes a background color different from that already stored in the register of the first program-table data memory 3 as a background specified for a genre, the data stored in the register of the first program-table data memory 3 is updated.

After priority levels assigned to genres are set, programs of each channel are specified one after another. If a specified program has two or more pieces of genre information, the user priority-level memory 12 is searched for a register including any of the pieces of genre information. That is to say, the registers of the user priority-level memory 12 are examined, starting with the register P (l, j, k) for storing the specified genre having the highest priority level, in order to determine whether the register includes information on a prioritized genre as information corresponding to any piece of genre information of the program. If the register includes the information on the corresponding prioritized genre, the program is set on a background color associated with the genre. If a specified program has only one piece of genre information or if a specified program has 2 or more pieces of genre information but the pieces of genre information do not match any information on a prioritized genre, on the other hand, a background color for each genre is determined on the basis of the data stored in the first program-table data memory 3. The program-table creation unit 8 creates display data of each program and display data of a background for the program for every channel, and outputs the created display data.

Assume for example that, as shown in FIG. 15A, priority levels are assigned to genres in the following order: 'music', 'drama' and 'movie'. In addition, let pieces of genre information of program A broadcast through a certain channel be 'sport', 'movie' and 'drama', whereas pieces of genre information of program B broadcast through another channel are 'movie', 'music' and 'variety'. In this case, as a result of the processing described above, in the program table displayed on the monitor, program A appears on a background color associated with 'drama' and program B appears on a background color associated with 'music', as shown in FIG. 15B.

As described above, in accordance with the third embodiment, a priority level is assigned to each genre information, which can have a plurality of different types each used for identifying the genre of a program. If a plurality of different types of genre information pertain to a program, genre information having the highest priority level assigned thereto is selected without regard to the order in which the different types of genre information are received. Then, display data of the genre indicated by the selected genre information is created. Thus, when a genre which the user wants to see is included in a program, by assigning a highest priority level to the genre, the genre can be displayed. As a result, the embodiment exhibits an effect that a genre of a program can be displayed in accordance with a priority level that can be recognized with ease by the user.

Fourth Embodiment

Next, a fourth embodiment of the present invention is explained by referring to FIGS. 16 and 17. FIG. 16 is a rough block diagram showing the configuration of a program-display control apparatus implemented by the fourth embodiment. In the configuration shown in FIG. 16, configuration elements identical with their counterparts included in the configuration of the first embodiment shown in FIG. 1 are denoted by the same reference numerals as the counterparts, and their explanations are not repeated. In collaboration with control means not shown in the figure, a genre-uniformity processor 13 (display-configuration modification means) reads out genre information included in program-table data of a BS digital broadcast from the first program-table data memory 3 and genre information included in program-table data of a ground wave broadcast and/or program-table data of web programs from the second program-table data memory 7, then changes the display configurations. The control means typically includes a CPU. It is to be noted that, much like the first embodiment described earlier, the program-table creation unit 8 creates display data for displaying both a program table of a satellite broadcast or a BS digital broadcast and either a program table of a ground wave broadcast and/or a web program table at the same time on the monitor (the display means) on the basis of program-table data received from the first program-table data memory 3 (the first storage means) and on the basis of program-table data received from the second program-table data memory 7 (the second storage means), respectively, outputting the created display data to the display means which is shown in none of the figures.

There is a difference in EPG-information transmission method as well as a difference in data format between genre information for identifying genres of programs in program-table data of a ground wave broadcast and/or genres of programs in web program-table data and genre information for identifying genres of programs in program-table data of a BS digital broadcast. With the conventional technology, a program table of a ground wave broadcast and a program table of a BS digital broadcast cannot be displayed on the same screen of a monitor at the same time. Thus, even if there is a difference in display configuration between pieces of genre information in these two communication methods, an undesirable state is not generated specially.

In accordance with the present invention, however, all the embodiments, including not only the fourth embodiment but also the other embodiments, are characterized in that they have a configuration in which a program table of a ground wave broadcast and/or a web program table and a program table of a BS digital broadcast can be displayed on the same screen of a monitor at the same time. Thus, making the genre display of a BS digital broadcast and the genre display of a ground wave broadcast and/or a web genre display uniform provides convenience to the user. In addition, even for a case in which a program table of a ground wave broadcast and a program table of a BS digital broadcast cannot be displayed on the same screen of a monitor at the same time, as is the case with the conventional technology, making the genre display of a BS digital broadcast and the genre display of a ground wave broadcast and/or a web genre display uniform provides convenience to the user as well. The fourth embodiment implements a configuration making the genre display of a BS digital broadcast and the genre display of a ground wave broadcast and/or a web genre display uniform.

The following description explains operations carried out to execute a program-display control method provided by the fourth embodiment. The genre-uniformity processor 13 reads out genre information in program-table data of a ground wave broadcast and/or genre information in web program-table data from the second program-table data memory 7, and collates the genre information read out from the second program-table data memory 7 with genre information stored in the first program-table data memory 3 as genre information in program-table data of a BS digital broadcast. That is to say, genres a of Gemstar EPG of a ground wave broadcast are collated with genres conforming to ARIB regulations of the BS digital broadcast as shown in FIG. 17. Then, the genre display of a BS digital broadcast and the genre display of a ground wave broadcast and/or a web genre display are made uniform.

For example, in an operation to read out genre information in program-table data of a ground wave broadcast and/or genre information in web program-table data from the second program-table data memory 7, the genre information is found to be typical information indicating a data format of 'a ground wave movie'. In this case, this genre information is changed to information indicating a data format of 'a movie' of a BS digital broadcast and stored back in the second program-table data memory 7. As a result, genre-information display data, which is created by the program-table creation unit 8 and then output to the display means, and display data of genre information in a BS digital broadcast are made uniform, and uniform genres are displayed on the screen of the monitor.

As described above, in accordance with the fourth embodiment, the program-display control apparatus is provided with the first program-table data memory 3 (the first storage means) for storing data of a program table for a BS digital broadcast and the second program-table data memory 7 (the second storage means) for storing data of a program table for a ground wave broadcast and/or web program-table data. The genre-uniformity processor 13 changes the display configuration of program-table data stored in the first program-table data memory 3 as data of a program table for a BS digital broadcast or the display configuration of program-table data stored in the second program-table data memory 7 as data of a program table for a ground wave broadcast and/or the web program-table data in such a way that the program tables can be displayed on the same screen at the same time. Thus, for example, the user can make video-recording reservations for a plurality of programs of the ground wave broadcast and the BS digital broadcast, which are received in the same week, at one time without switching the screen from the ground wave broadcast to the BS digital broadcast or vice versa. That is to say, the fourth embodiment exhibits an effect that uniform genres of programs are displayed in a state which can be recognized by the user with ease.

In addition, the same genre of a program included in the BS digital broadcast and a program included in the ground wave broadcast and/or a web program may be displayed in different genre display configurations in some cases. In accordance with the fourth embodiment, however, the genre display configurations of the same genre are made uniform. Thus, the fourth embodiment exhibits an effect that the genre of each program can be displayed in a uniform configuration that can be recognized by the user with ease without the need to be aware of whether the broadcast is a BS digital broadcast or a ground wave broadcast.

Fifth Embodiment

Next, a fifth embodiment of the present invention is explained by referring to FIGS. 18 to 22. FIG. 18 is a rough block diagram showing the configuration of a program-display control apparatus implemented by the fifth embodiment. In the configuration shown in FIG. 18, configuration elements identical with their counterparts included in the configuration of the first embodiment shown in FIG. 1 are denoted by the same reference numerals as the counterparts, and their explanations are not repeated. In collaboration with control means not shown in the figure, a time-frame enlargement display processor 14 (display-configuration modification means) modifies display areas of programs stored in the first program-table data memory 3 and the second program-table data memory 7 in accordance with an enlargement command or enlargement cancellation command given by the user by carrying out a remote operation. The control means typically includes a CPU. A time-frame enlargement stage register 15 is used for temporarily storing an enlargement stage S changed by the time-frame enlargement display processor 14. It is to be noted that the initial value of the enlargement stage stored in the time-frame enlargement stage register 15 is 1, which represents the state of a default display which is not enlarged.

Figure 19:
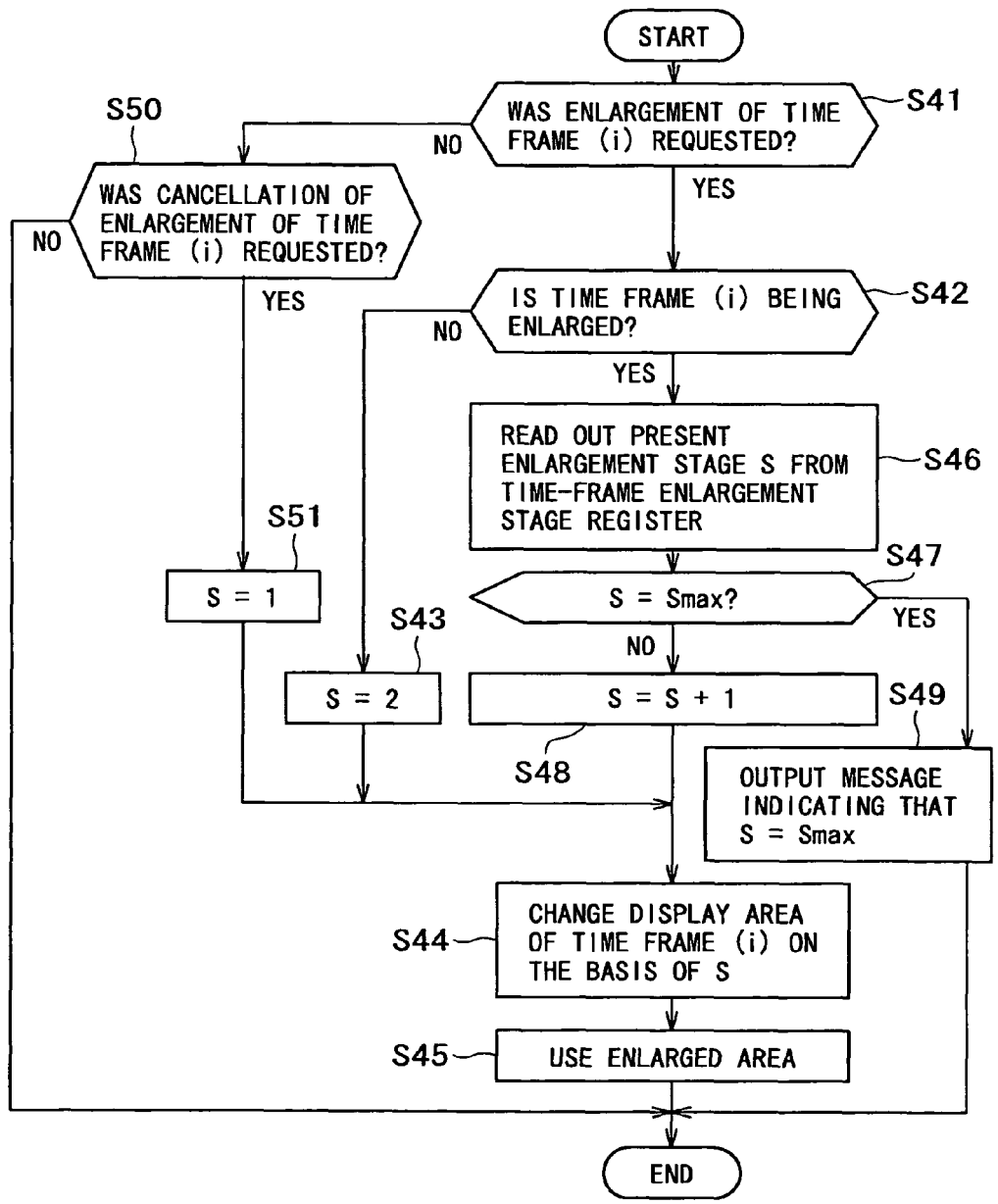
FIG. 19 shows a flowchart representing operations carried out by the fifth embodiment to execute processing of an enlarged time-frame display.

The following description explains operations carried out to execute a program-display control method provided by the fifth embodiment. FIG. 19 shows a flowchart representing operations carried out by the time-frame enlargement display processor 14 to execute processing of an enlarged time-frame display. The flow chart begins with step S41 to determine whether a command has been received to enlarge any time frame (i) in a channel being displayed. The command can be given by specifying the time frame (i) through the use of a cursor or by specifying an enlargement specification icon displayed on the screen. If an enlargement command has been received, the flow of the control goes on to step S42 to determine whether the time frame (i) has already been enlarged. If the time frame (i) has not been enlarged but is subjected to an enlargement command for the first time, the flow of the control goes on to step S43 at which the value of an enlargement stage S is set at 2. That is to say, the value of the enlargement stage S is changed from 1, indicating the state of a default display, to a state represented by an enlargement stage S of 2. Then, at the next step S44, the display area of the time frame (i) is changed on the basis of the enlargement stage S. Subsequently, at the next step S45, the data of the changed display area represented by the enlargement stage S of 2 is stored in the first program-table data memory 3 or the second program-table data memory 7 to be used as the data of the area after the enlargement.

In addition, the enlargement stage S can be displayed on a portion of the screen as an icon or characters typically representing a number. In the case of icons, both the present enlargement stage S and a maximum enlargement stage Smax are typically visually displayed. Alternatively, the present enlargement stage S and a maximum enlargement stage Smax can be visually displayed on the time frame (i) being enlarged.

If the determination result obtained at step S42 indicates that the time frame (i) has already been enlarged, on the other hand, the flow of the control goes on to step S46 at which the present enlargement stage S is read out from the time-frame enlargement stage register 15. Then, at the next step S47, the present enlargement stage S is compared with the maximum enlargement stage Smax. If the present enlargement stage S is not equal to the maximum enlargement stage Smax, the flow of the control goes on to step S48 at which the present enlargement stage S is incremented by 1. Then, at the next step S44, the display area of the time frame (i) is changed on the basis of the enlargement stage S. Thus, the display area of the time frame (i) is changed to an area corresponding to an enlargement stage which is one level higher than the present enlargement stage S. Subsequently, at the next step S45, the value of the changed enlargement stage S is sent to and stored in the first program-table data memory 3 or the second program-table data memory 7 to be used as the data of the area after the enlargement.

On the other hand, if the determination result obtained at step S47 indicates that the present enlargement stage S is equal to the maximum enlargement stage Smax, since the present enlargement stage S has reached a maximum value, the flow of the control goes to step S49 at which a message indicating that the display area cannot be enlarged anymore is sent to the first program-table data memory 3 or the second program-table data memory 7 to be used as the data of the area after the enlargement.

If the determination result obtained at step S41 indicates that the command given by the user is not a command to enlarge the time frame (i), on the other hand, the flow of the control goes to step S50 to determine whether the command given by the user is a command to cancel the enlargement of the time frame (i) which has already been enlarged. If the command given by the user is a command to cancel the enlargement of the time frame (i), the flow of the control goes to step S51 at which the enlargement stage S is set at 1. Then, at the next step S44, the display area of the time frame (i) is changed on the basis of the enlargement stage S. Thus, the display area of the time frame (i) is changed to an area corresponding to an enlargement stage of 1 which is the default state of no enlargement. Subsequently, at the next step S45, the data of the display area represented by the present enlargement stage S is sent to and stored in the first program-table data memory 3 or the second program-table data memory 7 to be used as the data of the area after the enlargement. In this case, the present enlargement stage S is the enlargement stage of 1.

Figure 20A:
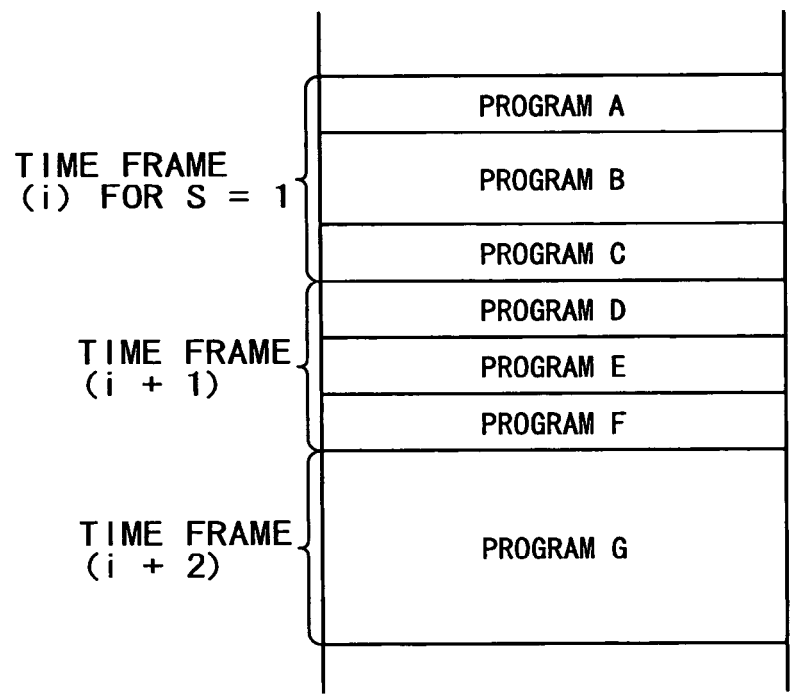
FIGS. 20A and 20B are diagrams showing typical changes of a display configuration in the fifth embodiment.
Figure 20B:
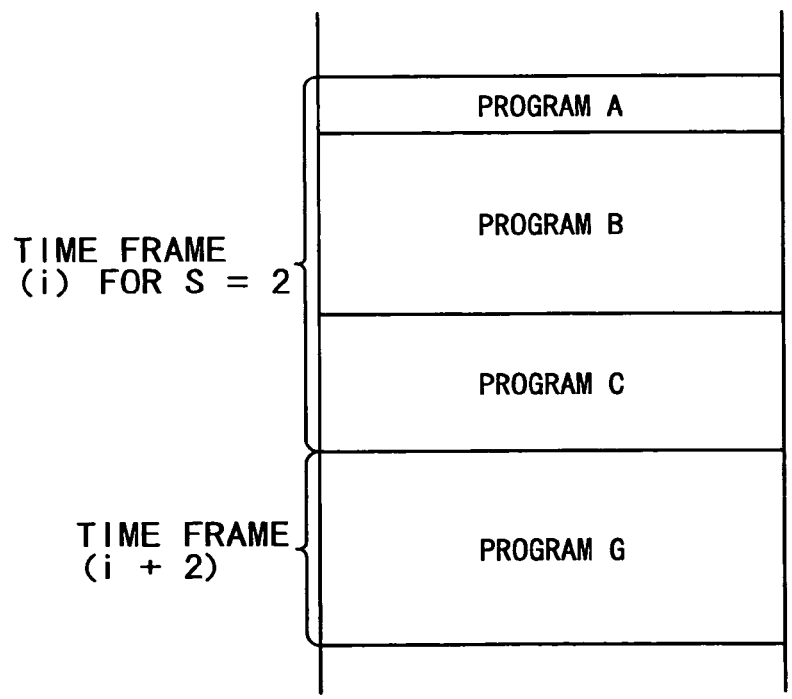

Next, typical enlarged displays are explained. FIG. 20A is a diagram showing a pre-enlargement program table for a channel. In a time frame (i), programs A, B and C exist. In the next time frame (i+1), programs D, E and F exist. Then, in the further time frame (i+2), program G exists. If a command to enlarge the time frame (i) is received in this circumstance, the display area of the time frame (i) is doubled to occupy the time frame (i) and the next time frame (i+1) as shown in FIG. 20B. Thus, a larger amount of information can be displayed. In consequence, the next time frame (i+1) is no longer displayed due to the enlargement of the time display (i).

Figure 21:
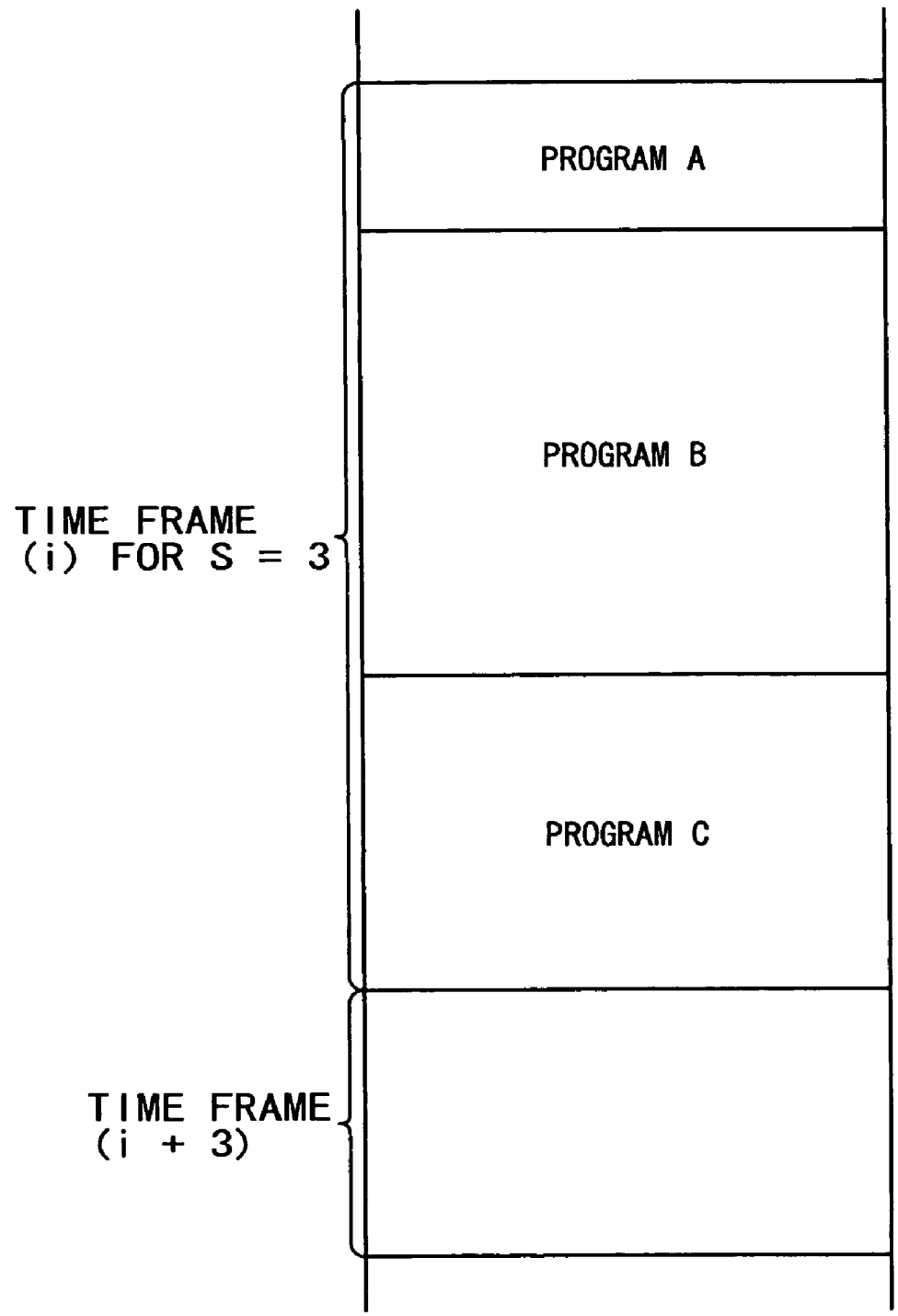
FIG. 21 is a diagram showing typical changes of a display configuration in the fifth embodiment.

If a command to enlarge the time frame (i) is received in the state shown in FIG. 20B, the time frame (i) is tripled as shown in FIG. 21. In consequence, the further time frame (i+2) is also no longer displayed. In this way, when commands to enlarge a specified time frame are received, the specified time frame is enlarged to occupy the next time frame step by step for each of the commands. For example, a one-hour frame display of a channel can also be enlarged to occupy the 24-hour display area of the channel. In addition, a time frame display of a channel can also be enlarged substantially to occupy one display area or a plurality of display areas of another channel.

Figure 22A:
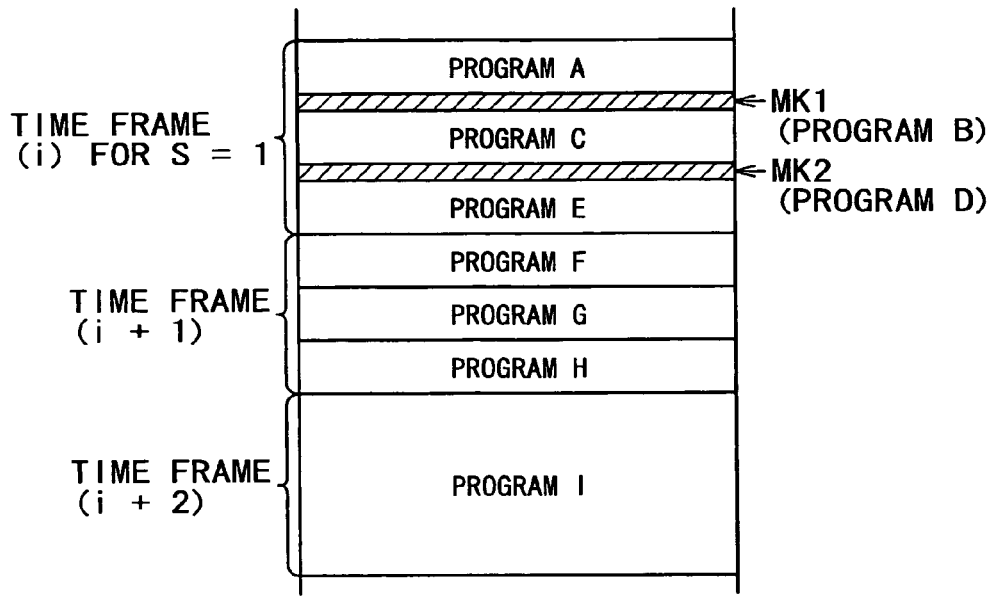
FIGS. 22A and 22B are diagrams showing typical changes of a display configuration in the fifth embodiment.
Figure 22B:
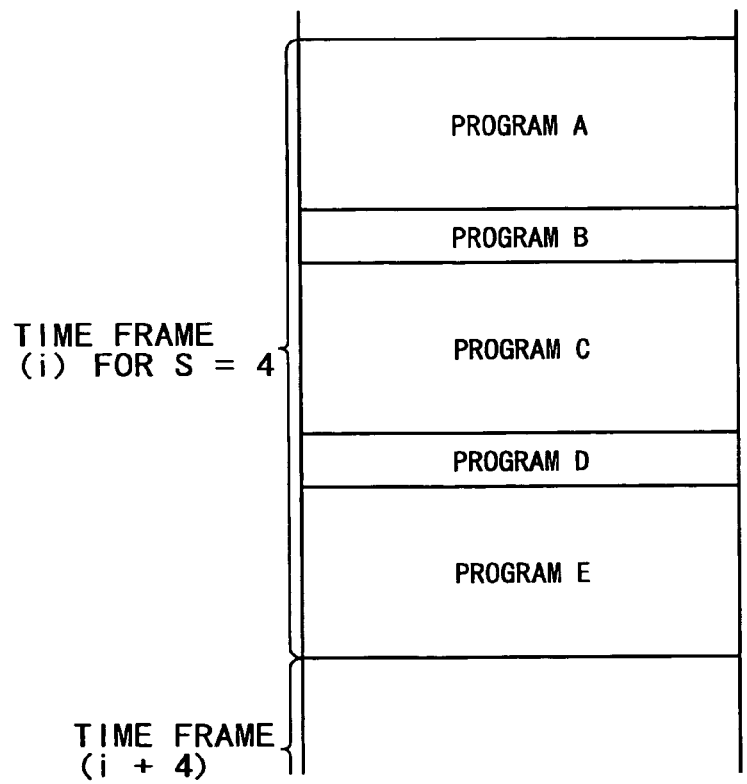

In addition, if program-display concealment marks MK1 and MK2, each occupying 0.5 lines, are included in a time frame (i) to conceal information on programs B and D, as shown in FIG. 22A, and a command to enlarge the time frame (i) is issued three times, a quadrupled enlarged time frame (i) is displayed, as shown in FIG. 22B. Thus, information on program B can be displayed on two lines in the area allocated to the program. By the same token, information on program D can also be displayed on two lines in the area allocated to the program. That is to say, by issuing a command to enlarge any time frame in any channel, the display of a program in the time frame can be enlarged.

As described above, in accordance with the fifth embodiment, if a command to enlarge any program in a program table being displayed is received, the display area of the program is enlarged. Thus, the embodiment exhibits an effect that, if the user wants to view more detailed information on any dummy program whose describing characters are not shown due to a displayed program-display concealment mark, the user can reveal the information on the desired program with ease by issuing a command to enlarge the program. When the display area of a program is enlarged, not only can the number of displayed characters describing the information be increased by keeping the size of the characters unchanged, but the size of the characters can also be increased as well by keeping the number of characters unchanged.

Sixth Embodiment

Figure 23:
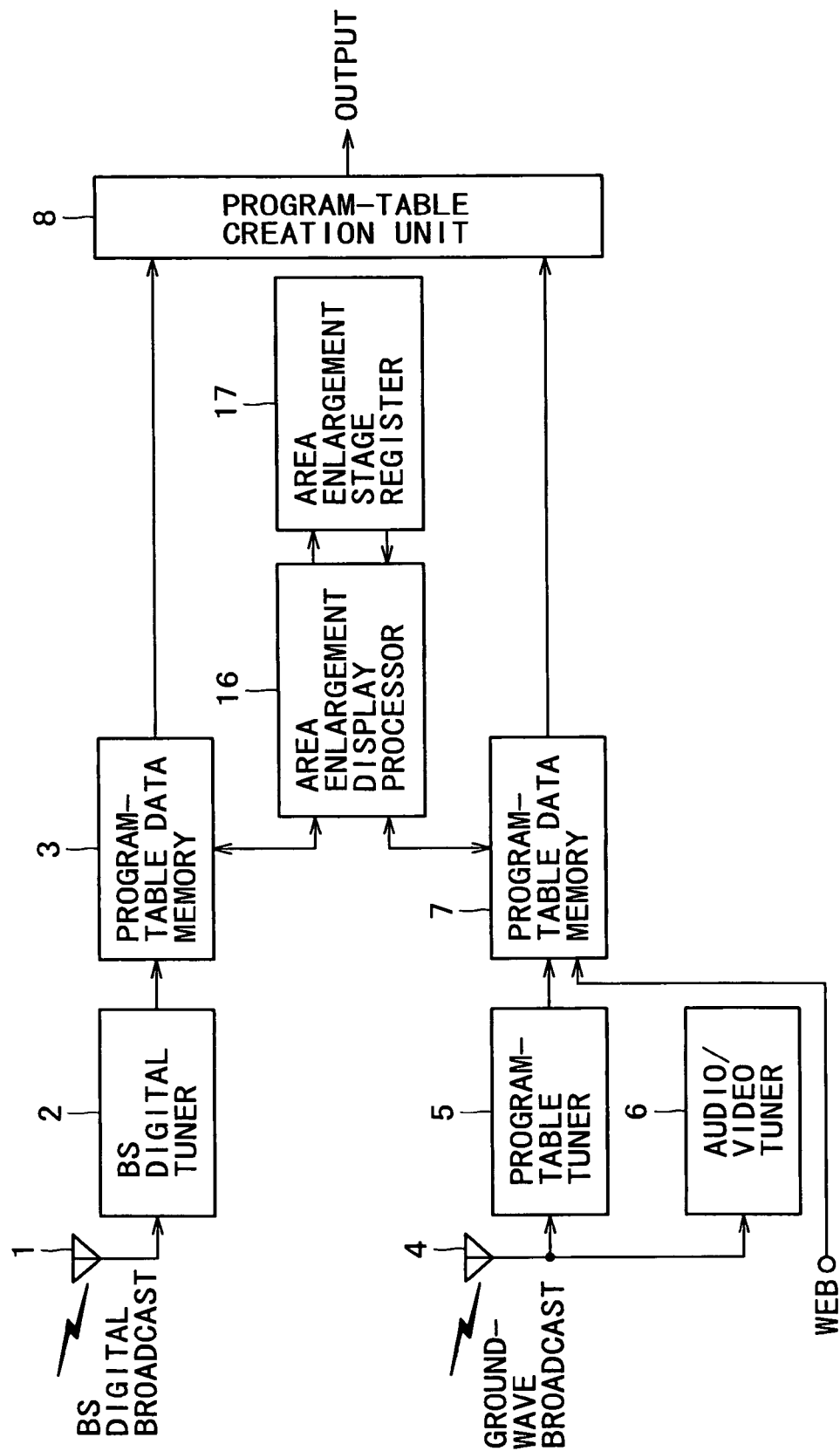
FIG. 23 is a rough block diagram showing the configuration of a program-display control apparatus implemented by a sixth embodiment of the present invention to execute program-display control.

Next, a sixth embodiment of the present invention is explained by referring to FIGS. 23 to 32. The sixth embodiment is another embodiment implementing the display enlargement process carried out by the fifth embodiment. FIG. 23 is a rough block diagram showing the configuration of a program-display control apparatus implemented by the sixth embodiment of the present invention. In the configuration shown in FIG. 23, configuration elements identical with their counterparts included in the configuration of the first embodiment shown in FIG. 1 are denoted by the same reference numerals as the counterparts, and their explanations are not repeated. In collaboration with control means not shown in the figure, an area enlargement display processor 16 (display-configuration modification means) modifies display areas of programs stored in the first program-table data memory 3 and the second program-table data memory 7 in accordance with an enlargement command or enlargement cancellation command given by the user by carrying out a remote operation. The control means typically includes a CPU. An area enlargement stage register 17 is used for temporarily storing an enlargement stage S changed by the area enlargement display processor 16. It is to be noted that the initial value of the enlargement stage stored in the time-frame enlargement stage register 17 is 1, which represents the state of a default display which is not enlarged.

Figure 24:
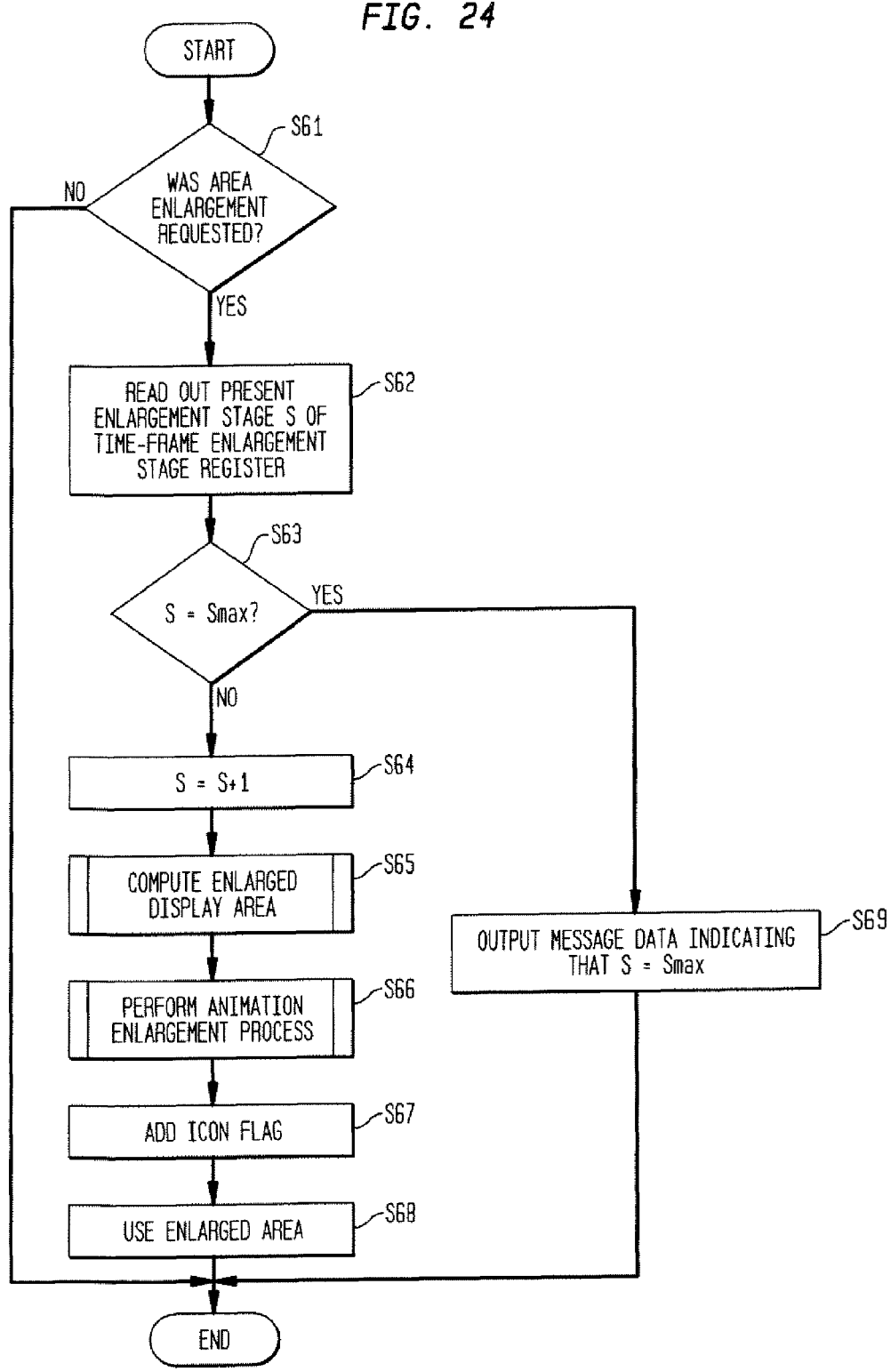
FIG. 24 shows a flowchart representing operations carried out by an enlarged-display processing unit implemented by the sixth embodiment.

The following description explains operations carried out to execute a program-display control method provided by the sixth embodiment. FIG. 24 shows a flowchart representing operations carried out by the area enlargement display processor 16 to execute processing of an area enlarged display. The flow chart begins with step S61 to determine whether a command has been received by the area enlargement display processor 16 to enlarge any area having a size corresponding to N×T where symbol N denotes any channel count and symbol T denotes any time frame. If the determination result obtained at step S61 indicates that such a command has been received, the flow of the control goes on to step S62 at which the present enlargement stage S is read out from the area enlargement stage register 17. Then, at the next step S63, the area enlargement display processor 16 determines whether the present enlargement stage S is equal to the maximum enlargement stage Smax. If the determination result obtained at step S63 indicates that the present enlargement stage S is equal to the maximum enlargement stage Smax, the flow of the control goes on to step S68 at which a message is sent to and stored in the first program-table data memory 3 or the second program-table data memory 7 indicating that the present enlargement stage S has reached a maximum value and, thus, the display area cannot be enlarged anymore.

Figures 25A, 25B:
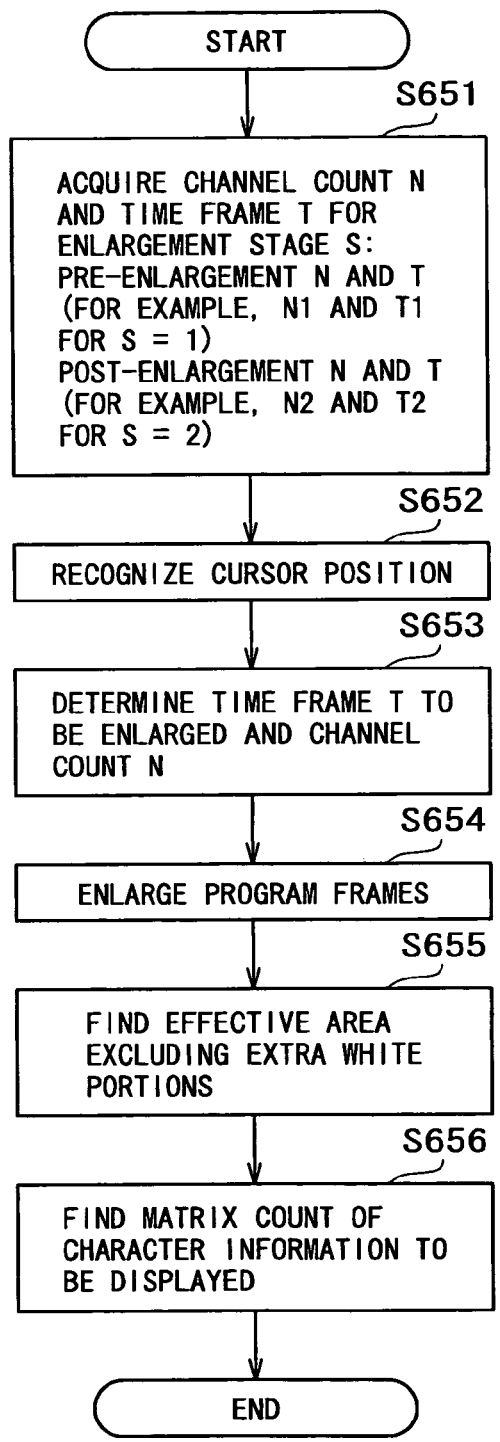
FIGS. 25A and 25B show a flowchart and table, respectively, representing an algorithm for computing a post-enlargement area in accordance with the sixth embodiment.

If the determination result obtained at step S63 indicates that the present enlargement stage S is not equal to the maximum enlargement stage Smax, on the other hand, the flow of the control goes on to step S64 at which the area enlargement display processor 16 increments the value of the enlargement stage S. Then, at the next step S65, the area enlargement display processor 16 calls a subroutine for computing the size of the enlarged display area. Details of this subroutine are shown in FIGS. 25A and 25B. Subsequently, at the next step S66, the area enlargement display processor 16 carries out an animation process to enlarge the area from an area prior to enlargement to a final enlarged area. Details of the subroutine called at step S66 are shown in FIGS. 26A to 26C. It is to be noted that, if it is not necessary to use the animation process, step S66 can be eliminated. In this case, the screen is enlarged from the area prior to enlargement to the final enlarged area instantaneously.

Figure 27:
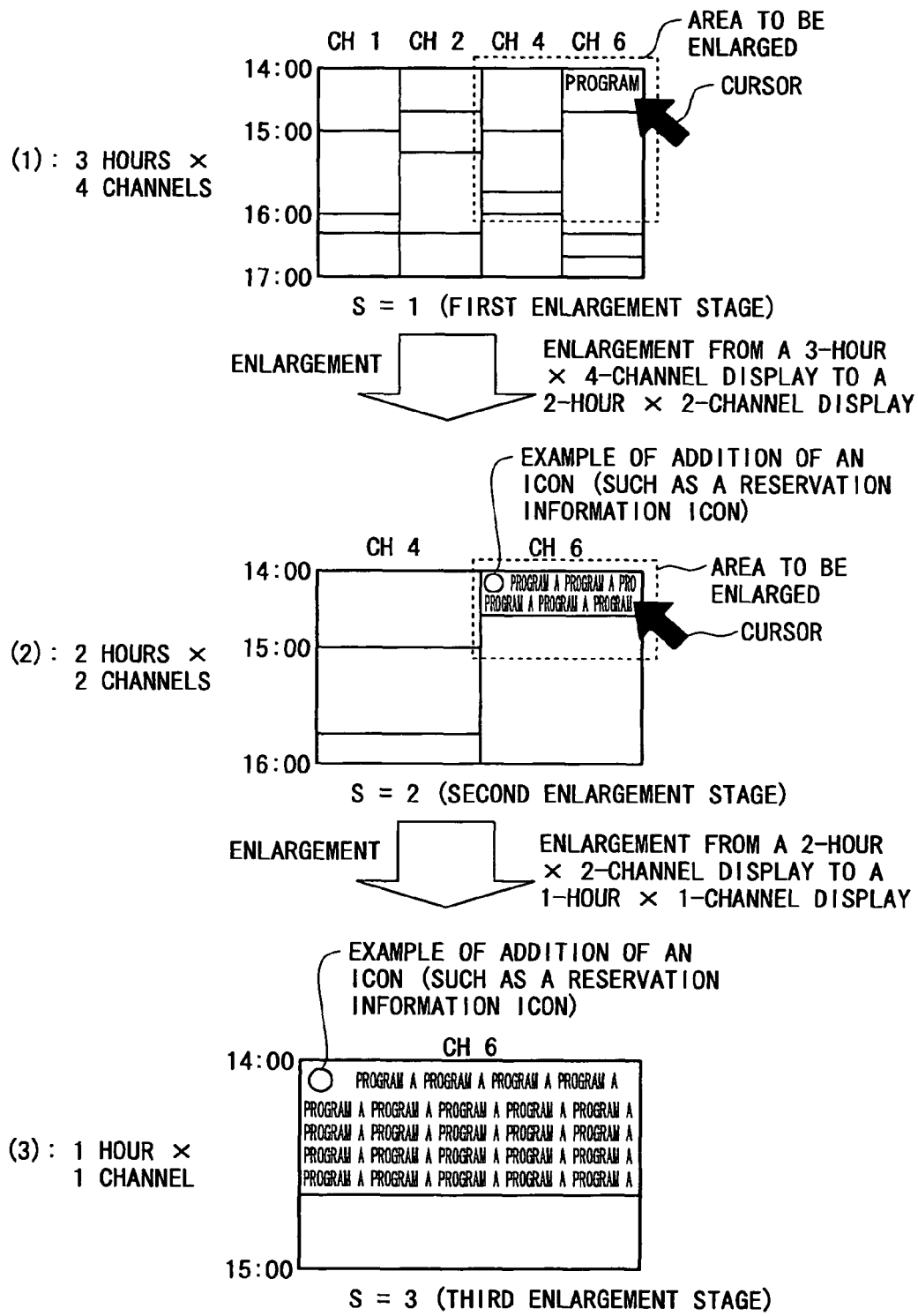
FIG. 27 is a diagram showing a state in which an area is enlarged in accordance with the sixth embodiment.

Then, at the next step S67, an icon flag is added to the program table. This icon flag is added at a location inside the program table if necessary, as shown in FIG. 27 (2) and FIG. 27 (3). There are a variety of icons. A typical icon represents reservation information or the like. Subsequently, an actual icon may be inserted on the basis of the value of the icon flag.

Then, at the next step S68, the area enlargement display processor 16 sends the value of the enlarged stage S to the first program-table data memory 3 or the second program-table data memory 7, and the program-table creation unit 8 replaces the area before the enlargement with the area after the enlargement. As a result, the area on the screen is actually enlarged.

Figure 29:
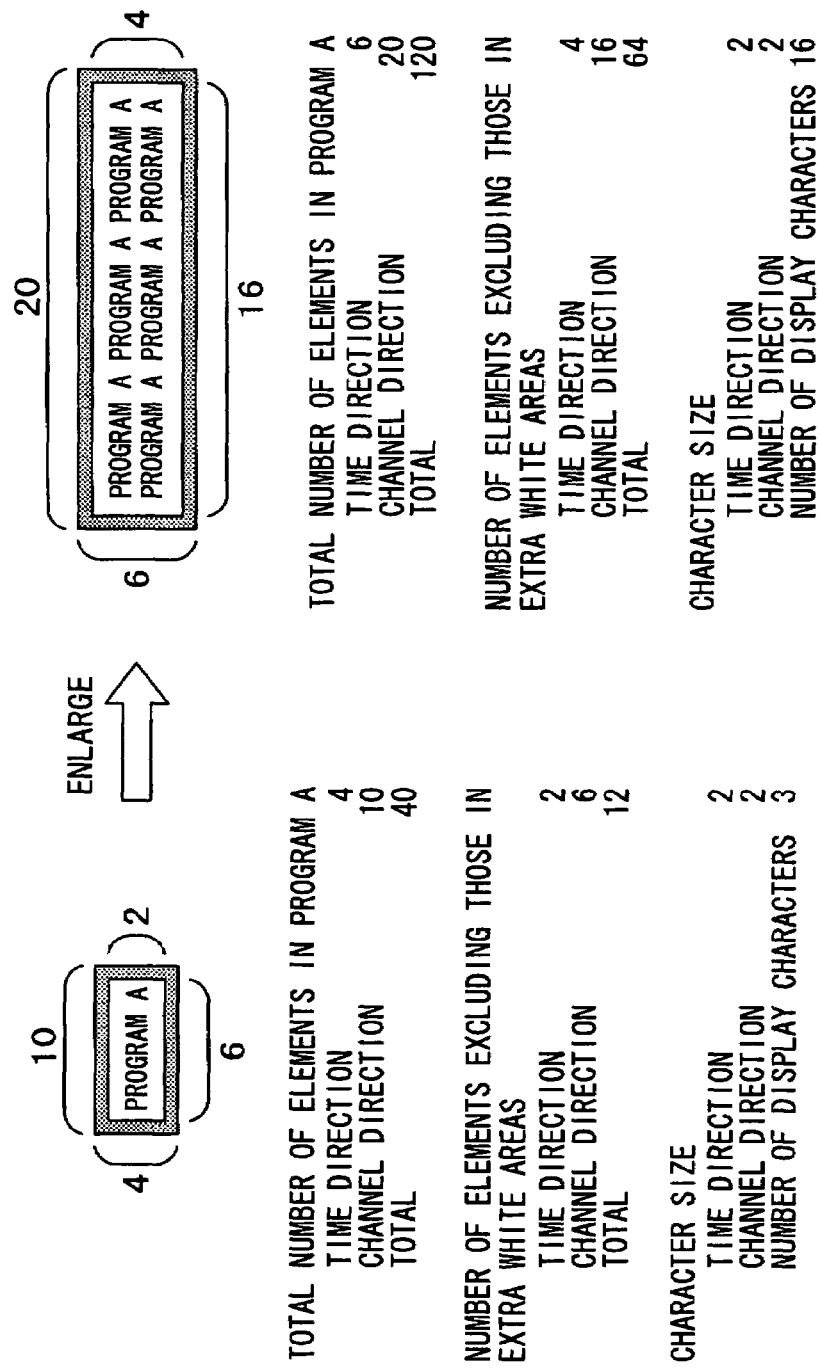
FIG. 29 is a diagram showing a typical computation algorithm for enlarging a program table in the sixth embodiment.

Next, the subroutine called at step S65 of the flowchart shown in FIG. 24 is explained by referring to FIGS. 25A to 29. FIG. 25A shows a flowchart representing a computation algorithm of area enlargement. FIG. 25B is a diagram showing a table used in the algorithm represented by the flowchart shown in FIG. 25A. FIGS. 26A to 26C are diagrams showing the typical calculation of an enlarged area. FIG. 27 is a diagram showing the concept of area enlargement. FIG. 28 is a diagram showing an increase in the amount of information as an increase of a program displaying area. FIG. 29 is a diagram showing a typical computation algorithm for enlarging a program table.

The flowchart of FIG. 25A begins with step S651 at which the area enlargement display processor 16 acquires a time frame T and a channel count N for the enlargement stage S on the basis of the enlargement stage S from the table shown in FIG. 25B. The table shown in FIG. 25B includes a typical channel count N1 of 4 and a typical time frame T1 of 3 for an enlargement stage S of 1. In addition, the table also includes a typical channel count N2 of 2 and a typical time frame T2 of 2 for an enlargement stage S of 2. Moreover, the table further includes a typical channel count N3 of 1 and a typical time frame T3 of 1 for an enlargement stage S of 3. At step S651, the value of the enlargement stage S is 1, so that a channel count N1 of 4 and a time frame T1 of 3 are allocated.

Then, at the next step S652, the area enlargement display processor 16 recognizes a portion pointed to by a cursor, which is operated by the user, as a portion to be enlarged. The state in which the portion is pointed to by the cursor is shown in FIG. 27 (1). Subsequently, at the next step S653, the area enlargement display processor 16 determines the time frame to be enlarged and the number of channels associated with the time frame from the position pointed to by the cursor. More specifically, with respect to the vertical axis (or the axis oriented in the time direction), a range displaying a specific one-hour frame including the start time of the program pointed to by the cursor and the one-hour frame following the specific frame is taken as the object of enlargement. With respect to the horizontal axis (or the axis oriented in the channel direction), on the other hand, the specific channel pointed to by the cursor and the channel on the left side of the specific channel are taken as the object of enlargement. That is to say, the area enlargement display processor 16 recognizes the point pointed to by the cursor and the portion enclosed by a dashed line to include the point as the portion to be enlarged. The state of determination of the portion to be enlarged is shown in FIG. 27 (1).

Then, at the next step S654, a computation for enlarging the portion to be enlarged is carried out. In this computation, the enlargement is computed with drawing elements each used as a unit of an area to be enlarged. Let symbol t1 denote the number of elements arranged in the time-frame direction in a pre-enlargement program pointed to by the cursor, symbol t2 denote the number of elements arranged in the time-frame direction in a post-enlargement program pointed to by the cursor, symbol n1 denote the number of elements arranged in the channel direction in a pre-enlargement program pointed to by the cursor and symbol n2 denote the number of elements arranged in the channel direction in a post-enlargement program pointed to by the cursor.

The values of t2 and n2 after the enlargement of the area of the program and the dilation ratio are expressed by the following equations:

$$t2 = t1 \times T1/T2$$

$$n2 = n1 \times N1/N2$$

Dilation ratio of screen area=$n2/n1 \times t2/t1$ (as shown in FIG. 28)

Subsequently, at the next step S655, an effective area for showing characters is found. Relations expressed by the above equations are shown in FIGS. 26A to 26C. FIG. 26A is a diagram showing the whole area of a screen displaying a program. In general, the number of all elements arranged in the time direction in the whole area of the screen is t and the number of all elements arranged in the channel direction in the area of the screen is n. In particular, the number of elements arranged in the time direction in the display area of a program is t1 and the number of elements arranged in the channel direction in the display area of the program is n1. In this case, the display area of a character is computed in accordance with the equations given below. FIGS. 26B and 26C are diagrams showing outlines of areas used in the computation.

Number of elements arranged in the time direction:

$$t2 - (U2 + D2)$$

Number of elements arranged in the channel direction:

$$n2 - (R2 + L2)$$

In the above expressions, symbol U2 denotes the difference between the upper portion of the entire screen area and the upper portion of the program area prior to the enlargement, symbol D2 denotes the difference between the lower portion of the entire screen area and the lower portion of the program area prior to the enlargement, symbol R2 denotes the difference between the right portion of the entire screen area and the right portion of the program area prior to the enlargement, whereas symbol L2 denotes the difference between the left portion of the entire screen area and the left portion of the program area prior to the enlargement.

Then, the flow of the subroutine goes on to step S656 to find the number of characters that can be displayed in the effective display area computed as described above. Let symbol h2 denote the height of a character in the enlarged area and symbol w2 denote the width of the character. In this case, the number of rows arranged in the time direction and the number of columns arranged in the channel direction are found in accordance with the following equations:

Number of rows arranged in the time direction:

$$(t2-(U2+D2))/h2$$

Number of columns arranged in the channel direction:

$$(n2-(R2+L2))/w2$$

In the above equations, a fraction on the right side of a decimal point is discarded. If the size of each character is assumed to be the same as that prior to the enlargement of the screen, an increase in information amount can be found in accordance with the following equation:

$$\{(n2-(R2+L2)/w2)/(n1-(R1+L1)/w1)\} \times \{(t2-(U2+D2)/h2)/(t1-(U1+D1)/h2)\}$$

The above equation is shown in FIG. 28.

By using the increased information computed in this way as a base, the program area is enlarged as shown in FIG. 27 (2). The area shown in FIG. 27 (2) is also enlarged to an area shown in FIG. 27 (3) in the same way as described above. As is obvious from characters appearing on the program columns shown in FIGS. 27 (1), 27 (2) and 27 (3), the number of characters increases so that the amount of information described by the characters also rises as well.

By referring to the diagram shown in FIG. 29, the following description explains an example showing that the number of characters increases so that the amount of information described by the characters also rises as well. Prior to the enlargement of the area, let the element count t1 in the time direction be 4 and the element count n1 in the channel direction be 10. Thus, the number of all elements in the frame for program A is 4×10=40. Since the number of elements arranged in the time direction in extra white areas is 2 and the number of elements arranged in the channel direction in the extra white areas in this frame is 4, the number of elements in the effective area of the frame is 12. Assume that the size of a character is 2×2=4 elements. In this case, the number of characters that can be displayed in the effective area having a size of 12 elements is thus 12/4=3. That is to say, up to 3 characters can be displayed in the effective area. After the enlargement of the area, on the other hand, let the element count t2 in the time direction be 6 and the element count n2 in the channel direction be 20. Thus, the number of all elements in the frame for program A is 6×20=120. Since the number of elements arranged in the time direction in extra white areas in this frame is 2 and the number of elements arranged in the channel direction in the extra white areas is 4, the number of elements in the effective area of the frame is 64. Assume that the size of a character remain unchanged at 2×2=4 elements. In this case, the number of characters that can be displayed in the effective area having a size of 64 elements is thus 64/4=16. It is therefore obvious that the number of characters that can be displayed in the effective area increases from 3 to 16.

The following description explains the subroutine called at step S66 of the flowchart shown in FIG. 24.

Assume, for example, that a program table is enlarged from a size corresponding to an enlargement stage of 1 to a size corresponding to an enlargement stage of 2. In this case, the subroutine enlarges the program table from the size corresponding to the enlargement stage of 1 to the size corresponding to the enlargement stage of 2 not directly, but by dividing the state between the enlargement stage of 1 and the enlargement stage of 2 into several enlargement sub-stages as shown in FIG. 27. That is to say, the enlargement process is displayed as animations.

Figure 30:
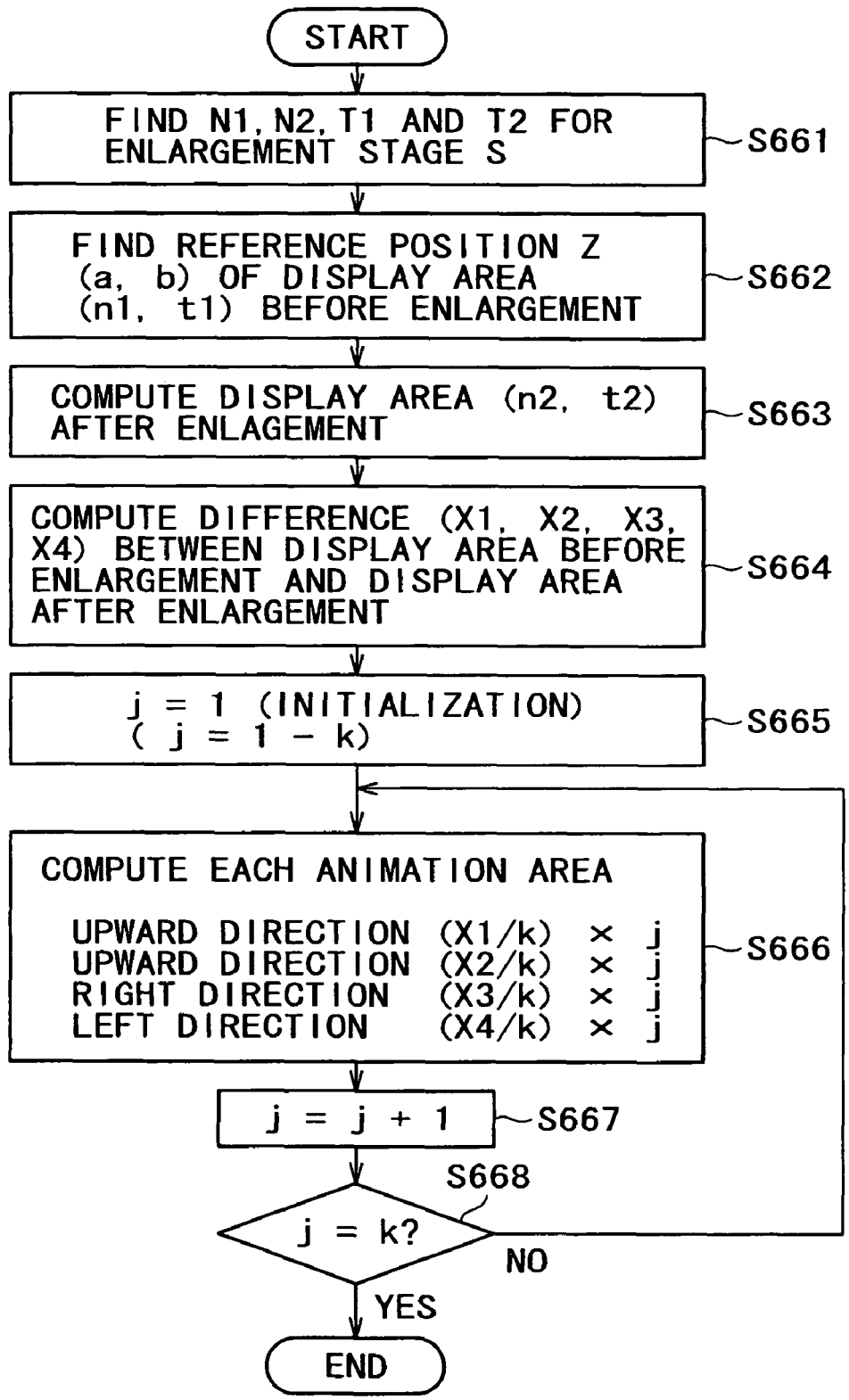
FIG. 30 shows a flowchart representing an algorithm for displaying enlargement animations in accordance with the sixth embodiment.
Figure 31:
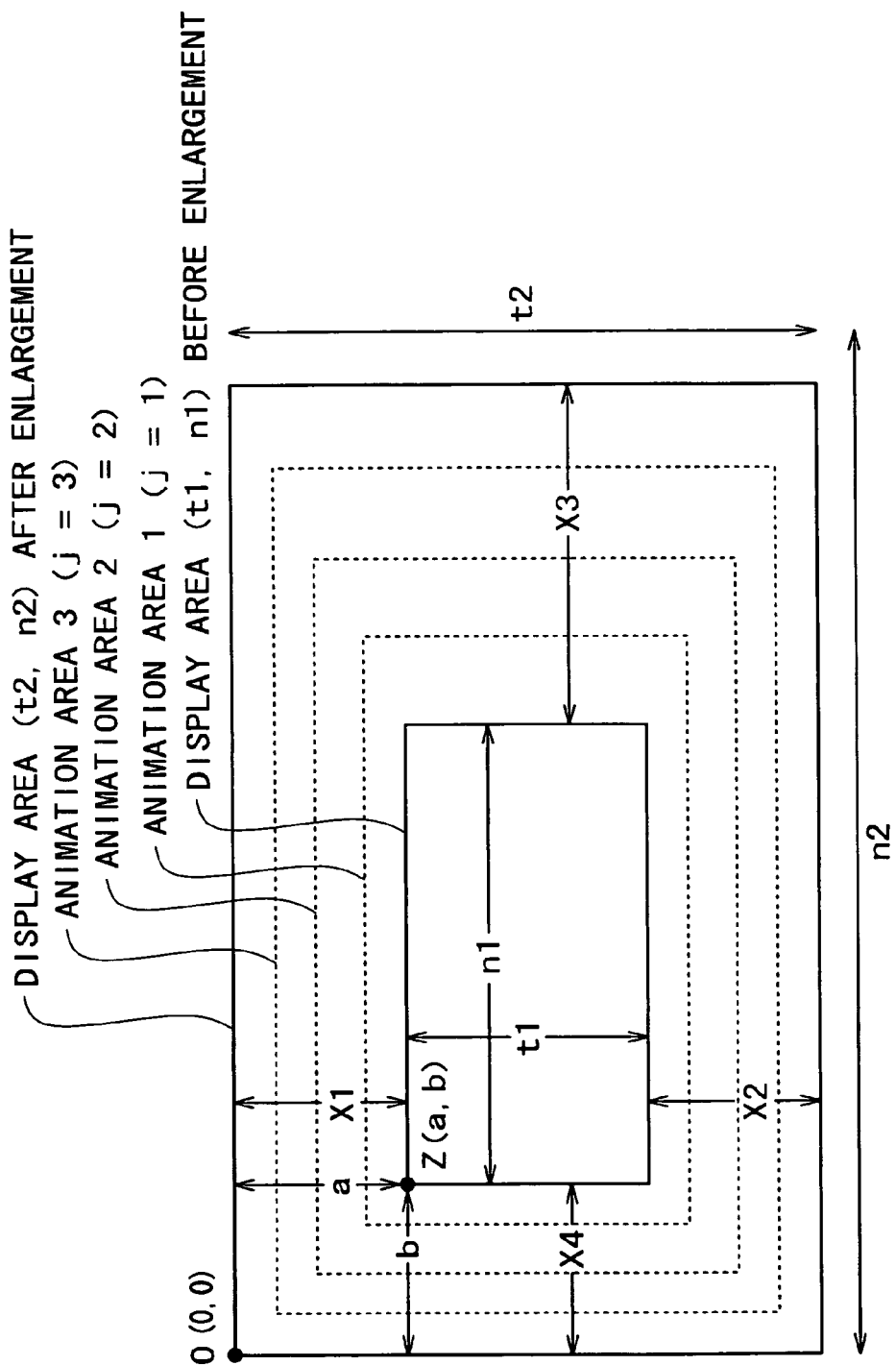
FIG. 31 is a diagram referred to in explaining the computation of areas before and after enlargement of a program table in the sixth embodiment.

FIG. 30 shows a flowchart representing the subroutine called at step S66 as a subroutine adopting an algorithm for displaying enlargement animations. FIG. 31 is a diagram referred to in explaining the computation of areas before and after enlargement of a program table and the computation of the area of an animation screen. FIG. 32 is a diagram showing typical animation displays of an enlargement of a program table. The algorithm for displaying enlargement animations is explained by referring to FIGS. 30 to 32 as follows.

The flowchart shown in FIG. 30 begins with step S661 at which N1, N2, T1 and T2 for the enlargement stages S are found. Then, at the next step S662, a reference position Z (a, b) of a pre-enlargement area (t1, n1) shown in FIG. 31 is found. A reference point O (0, 0) at that time becomes the reference point of a post-enlargement area (t2, n2). Subsequently, at the next step S663, a post-enlargement area (t2, n2) is computed. Then, at the next step S664, the differences (X1, X2, X3, X4) between the pre-enlargement area and the post-enlargement area are computed, where symbol X1 denotes the distance between the upper side of the pre-enlargement area (t1, n1) and the upper side of the post-enlargement area (t2, n2), symbol X2 denotes the distance between the lower side of the pre-enlargement area (t1, n1) and the lower side of the post-enlargement area (t2, n2), symbol X3 denotes the distance between the right side of the pre-enlargement area (t1, n1) and the right side of the post-enlargement area (t2, n2) and symbol X4 denotes the distance between the left side of the pre-enlargement area (t1, n1) and the left side of the post-enlargement area (t2, n2). The values of X1, X2, X3 and X4 are computed as follows:

$$X1=a$$

$$X2=t2-(a+t1)$$

$$X3=n2-(b+n1)$$

$$X4=b$$

Where $$n1=n2\times(N2/N1)$$

$$t1=t2\times(T2/T1)$$

It is to be noted that, in order to enlarge the post-enlargement area (t2, n2) to the full screen, t2 is set at t and n2 is set at n.

Next, displays of animations are explained. A transition from the pre-enlargement area (t1, n1) to the post-enlargement area (t2, n2) is divided into k stages and displayed as animations. In this case, the differences X1, X2, X3 and X4 are each divided by k and, by changing j from 1 to k, each animation area can be computed. This processing is carried out at steps S665 to S668. To be more specific, at step S665, j is set at an initial value of 1. Then, at the next step S666, the area of an animation at the first stage is computed. Subsequently, at the next step S667, j is incremented by 1. Then, at the next step S668, j is compared with k to determine whether the processing has been completed. If j is smaller than k, the flow of the subroutine goes back to step S666 to compute the next animation area. This is because all of the animation areas have not been found. If all of the animation areas have been found, on the other hand, the execution of the subroutine is ended. By carrying out the computation described above, animation areas 1 to 3 shown in FIG. 31 are computed. As will be described later, on the basis of this computation, the actual enlargement process is carried out at step S68.

As the execution of the subroutine is completed, the flow of the processing represented by the flowchart shown in FIG. 24 goes on to step S67 at which an icon flag for displaying an icon is added if it is necessary to display an icon in the enlarged display area. Then, at the next step S68, the actual enlargement process is carried out on the basis of the results of the computation performed as described above. If the enlargement animation process of step S66 is not necessary, the actual enlargement process is carried out on the basis of the enlargement results obtained at step S65. If the enlargement animation process has been carried out at step S66, on the other hand, the actual enlargement process is carried out on the basis of the enlargement results obtained at step S66.

A typical animation enlargement process actually carried out at step S68 is explained by referring to FIG. 32. FIG. 32 (1) is a diagram showing a display area for S=1, that is, a pre-enlargement display area (t1, n1). FIG. 32 (2) is a diagram showing animation area 1 computed at step S666 of the flowchart shown in FIG. 30 for j=1. FIG. 32 (3) is a diagram showing animation area 2 computed at step S666 of the flowchart shown in FIG. 30 for j=2. FIG. 32 (4) is a diagram showing animation area 3 computed at step S666 of the flowchart shown in FIG. 30 for j=3. FIG. 32 (5) is a diagram showing a display area for S=2, that is, a post-enlargement display area (t2, n2). Since the animation areas shown in FIGS. 32 (1) to (5) are displayed on the screen by sequentially switching the screen from one display area to the next one, the progress of the enlargement process with the lapse of time can be confirmed visually.

In addition, an icon is displayed at a specified position as shown in FIG. 32 (5) on the basis of the icon flag added at step S67 of the flowchart shown in FIG. 24.

The embodiments described above are no more than preferred implementations for explaining the present invention. That is to say, the present invention is not limited to the embodiments described above, and the embodiments can thus be modified in a variety of ways within a range of essentials of the present invention.

For example, the embodiments described above may implement the program-display control apparatus provided by the present invention as not only a television receiver, but also obviously as a system including an information-processing apparatus. An example of the information-processing apparatus is a personal computer or a portable information terminal for receiving typical program-table data of a BS digital broadcast and program-table data of a ground wave broadcast and/or web program-table data, and for displaying the received program-table data on a monitor. If a personal computer or a portable information terminal is used as the program-display control apparatus as described above, the user can enter a command by utilizing a pointing device, such as a mouse or a writing pen, instead of using the remote controller of the television receiver.

As described above, the present invention exhibits an effect that program-table data of a BS digital broadcast and program-table data of a ground wave broadcast and/or web program-table data are received and their display configurations are changed to a display configuration that allows the user to recognize their program tables with ease.

In addition, even in the case of a displayed program table including a dummy program represented by a program-display concealment mark for concealing characters describing information on the program, the present invention exhibits an effect that, by giving an enlargement command, the user can recognize the information on a desired program with ease.

On the top of that, by carrying out processing to display animations as an implementation of an enlargement process, the screen enlargement progress with the lapse of time can be confirmed visually.

The invention claimed is:

1. A program-display control apparatus, comprising:
   a storage unit operable to store program-table data having a predetermined display configuration;
   a display-configuration modification unit operable to change the display configuration of the program-table data read out from the storage unit to a new display configuration in accordance with a display-configuration modification command;
   a program-table creation unit operable to create data of a program table based on the new display configuration and to output the data to a predetermined display; and
   a display-line comparison unit operable to compare a number of programs in a given time frame with a maximum number of display lines that can be included in the given time frame and to determine whether the number of programs in the given time frame is smaller than, is equal to, or is greater than the maximum number of display lines,
   in response to the display-line comparison unit determining that the number of programs in the given time frame is smaller than the maximum number of display lines, the display-configuration modification unit being further operable to find a display-line count of each individual program in the given time frame as a quantity proportional to a time duration of the individual program and allocate as many display lines to each individual program in the given time frame as indicated by the display-line count found for the individual program in a descending-duration order starting with a program having a longest time duration,
   in response to the display-line comparison unit determining that the number of programs in the given time frame is equal to the maximum number of display lines, the display-configuration modification unit being further operable to allocate display lines composing a minimum display-area unit to each of the programs, and
   in response to the display-line comparison unit determining that the number of programs in the given time frame is greater than the maximum number of display lines, the display-configuration modification unit being further operable to display an identifier for indicating that undisplayed programs exist and allocate remaining lines composing the minimum display-area unit to each of the programs in a descending-duration order starting with a program having a longest time duration.

2. The program-display control apparatus according to claim 1, wherein a shared-event program is received over a plurality of reception channels, and the display-configuration modification unit is further operable to change the display configuration of the shared-event program from a display configuration in which the shared-event program is displayed in separate areas for each of the plurality of reception channels to a display configuration in which the shared-event program is displayed in an area spread over the plurality of reception channels.

3. The program-display control apparatus according to claim 2, wherein a time frame of the shared-event program in any one of the plurality of reception channels does not overlap a time frame of the shared-event program in any other one of the plurality of reception channels, and the display-configuration modification unit is further operable to change the display configuration of the shared-event program to a display configuration in which the shared-event program is displayed on display lines composing a minimum display-area unit in an area spread over the plurality of reception channels.

4. The program-display control apparatus according to claim 1, wherein the display-configuration modification unit is further operable to assign a priority level to each of various pieces of genre information in accordance with a display-configuration modification command, the pieces of genre information identifying the genre of a program, select one of a plurality of pieces of genre information for a program on the basis of the priority levels assigned to the pieces of genre information if the pieces of genre information pertain to the program, and change the display configurations of programs to a display configuration in which genres of the programs are displayed on the basis of the priority levels assigned to the pieces of genre information.

5. The program-display control apparatus according to claim 1, wherein the display-configuration modification unit is further operable to assign a priority level to each piece of genre information and each background display configuration in accordance with a display-configuration modification command, and change the display configurations of programs to a display configuration in which the genre information and the background display configuration of each of the programs are displayed on the basis of the priority level assigned to the piece of genre information and the background display configuration.

6. The program-display control apparatus according to claim 1, wherein the storage unit includes a first storage area operable to store first program-table data having a data configuration and a second storage area operable to store second program-table data having a data configuration different from the data configuration of the first program-table data, and the display-configuration modification unit is further operable to change the display configuration of the first program-table data stored in the first storage area and the display configuration of the second program-table data stored in the second storage area to a display configuration in which the first program-table data and the second program-table data are displayed on the same screen at the same time.

7. The program-display control apparatus according to claim 1, wherein the storage unit includes a first storage area operable to store data of a program table of a satellite broadcast and a second storage area operable to store at least one of data of a program table of a ground wave broadcast and data of a web program table, and the display-configuration modification unit is further operable to change the display configuration of the data of a program table of a satellite broadcast stored in the first storage area and the display configuration of the at least one of the data of a program table of a ground wave broadcast and the data of a web program table stored in the second storage area to a display configuration in which the data of a program table of a satellite broadcast and the at least one of the data of a program table of a ground wave broadcast and the data of a web program table are displayed on the same screen at the same time.

8. The program-display control apparatus according to claim 7, wherein a first program of a satellite broadcast has a first genre having a first display configuration, at least one of a second program of a ground wave broadcast and a web program has a second genre having a second display configuration, the second genre being the same as the first genre but the first display configuration being different from the second display configuration, and the display-configuration modification unit is further operable to change at least one of the display configurations so that the first and second genres have a uniform display configuration.

9. The program-display control apparatus according to claim 1, wherein a command to enlarge a program of a displayed program table is received, and the display-configuration modification unit is further operable to change the display configuration of the program to a display configuration in which the display of the program is enlarged.

10. The program-display control apparatus according to claim 9, wherein in processing the command to enlarge the program:
in response to a present enlargement stage not having reached a maximum enlargement stage, the display-configuration modification unit is further operable to increase the present enlargement stage by a predetermined stage increment to set the present enlargement stage at a higher level and changes the display configuration of the program table to a display configuration in which the program table is enlarged to an enlargement stage set at the higher level, and
in response to the present enlargement stage having reached the maximum enlargement stage, the display-configuration modification unit is further operable to change the display configuration of the program table to a display configuration in which a message is displayed stating that the present enlargement stage has reached the maximum enlargement stage.

11. The program-display control apparatus according to claim 9, wherein the display-configuration modification unit is further operable to gradually enlarge the display of the program by displaying a plurality of animations in a time period between a present enlargement stage and a next enlargement stage in a process to change the present enlargement stage to the next enlargement stage.

12. A program-display control method, comprising:
storing program-table data having a predetermined display configuration;
changing the display configuration of the stored program-table data to a new display configuration in accordance with a display-configuration modification command;
creating data of a program table on the basis of the new display configuration and outputting the data to a predetermined display;
comparing a number of programs in a given time frame with a maximum number of display lines that can be included in the time frame;
determining whether the number of programs in the given time frame is smaller than, is equal to, or is greater than the maximum number of display lines;
in response to the determining step determining that the number of programs in the given time frame is smaller than the maximum number of display lines,
the changing step including finding a display-line count of each individual program in the given time frame as a quantity proportional to a time duration of the individual program and allocating as many display lines to each individual program in the given time frame as indicated by the display-line count found for the individual program in a descending-duration order starting with a program having a longest time duration;

in response to the determining step determining that the number of programs in the given time frame is equal to the maximum number of display lines, the changing step including allocating display lines composing a minimum display-area unit to each of the programs; and in response to the determining step determining that the number of programs in the given time frame is greater than the maximum number of display lines, the changing step includes displaying an identifier for indicating that undisplayed programs exist and allocating remaining lines composing the minimum display-area unit to each of the programs in a descending-duration order starting with a program having a longest time duration.

13. The program-display control method according to claim 12, wherein a shared-event program is received over a plurality of reception channels, and the changing step includes changing the display configuration of the shared-event program from a display configuration in which the shared-event program is displayed in separate areas for each of the plurality of reception channels to a display configuration in which the shared-event program is displayed in an area spread over the plurality of reception channels.

14. The program-display control method according to claim 13, wherein a time frame of the shared-event program in any one of the plurality of reception channels does not overlap a time frame of the shared-event program in any other one of the plurality of reception channels, and the changing step includes changing the display configuration of the shared-event program to a display configuration in which the shared-event program is displayed on display lines composing a minimum display-area unit in an area spread over the plurality of reception channels.

15. The program-display control method according to claim 12, wherein the changing step includes:

assigning a priority level to each of various pieces of genre information in accordance with a display-configuration modification command, the pieces of genre information identifying the genre of a program, selecting one of a plurality of pieces of genre information for a program on the basis of the priority levels assigned to the pieces of genre information if the pieces of genre information pertain to the program, and changing the display configurations of programs to a display configuration in which genres of the programs are displayed on the basis of the priority levels assigned to the pieces of genre information.

16. The program-display control method according to claim 12, wherein the changing step includes:

assigning a priority level to each piece of genre information and each background display configuration in accordance with a display-configuration modification command, and changing the display configurations of programs to a display configuration in which the genre information and the background display configuration of each of the programs are displayed on the basis of the priority level assigned to the piece of genre information and the background display configuration.

17. The program-display control method according to claim 12, wherein:

the storing step includes storing first program-table data having a data configuration in a first storage area and storing second program-table data having a data configuration different from the data configuration of the first program-table data in a second storage area; and the changing step includes changing the display configuration of the first program-table data stored in the first storage area and the display configuration of the second program-table data stored in the second storage area to a display configuration in which the first program-table data and the second program-table data are displayed on the same screen at the same time.

18. The program-display control method according to claim 12, wherein:

the storing step includes storing data of a program table of a satellite broadcast in a first storage area and storing at least one of data of a program table of a ground wave broadcast and data of a web program table in a second storage area; and the changing step includes changing the display configuration of the data of a program table of a satellite broadcast stored in the first storage area and the display configuration of the at least one of the data of a program table of a ground wave broadcast and the data of a web program table stored in the second storage area to a display configuration in which the data of a program table of a satellite broadcast and the at least one of the data of a program table of a ground wave broadcast and the data of a web program table are displayed on the same screen at the same time.

19. The program-display control method according to claim 18, wherein a first program of a satellite broadcast has a first genre having a first display configuration, and at least one of a second program of a ground wave broadcast and a web program has a second genre having a second display configuration, the second genre being the same as the first genre but the first display configuration being different from the second display configuration, and the changing step includes changing at least one of the first and second display configurations so that the first and second genres have a uniform display configuration.

20. The program-display control method according to claim 12, wherein a command to enlarge a program of a displayed program table is received, and the changing step includes changing the display configuration of the program to a display configuration in which the display of the program is enlarged.

21. The program-display control method according to claim 20, wherein in processing the command to enlarge the program:

in response to a present enlargement stage not having reached a maximum enlargement stage, the changing step includes increases the present enlargement stage by a predetermined stage increment to set the present enlargement stage at a higher level, and changing the display configuration of the program table to a display configuration in which the program table is enlarged to an enlargement stage set at the higher level; and in response to the present enlargement stage having reached the maximum enlargement stage, the changing step includes changing the display configuration of the program table to a display configuration in which a message is displayed stating that the present enlargement stage has reached the maximum enlargement stage.

22. The program-display control method according to claim 20, wherein the changing step includes gradually enlarging the display of the program by displaying a plurality of animations in a time period between a present enlargement stage and a next enlargement stage in a process to change the present enlargement stage to the next enlargement stage.

* * * * *